US012508596B2

(12) United States Patent
Reznitchenko et al.

(10) Patent No.: US 12,508,596 B2
(45) Date of Patent: Dec. 30, 2025

(54) CRUSHING DEVICE

(71) Applicant: Metso Outotec USA Inc., Waukesha, WI (US)

(72) Inventors: Vadim Reznitchenko, Mechanicsburg, PA (US); Keith Harbold, York, PA (US)

(73) Assignee: Metso USA Inc., Brookfield, WI (US)

( * ) Notice: Subject to any disclaimer, the term of this patent is extended or adjusted under 35 U.S.C. 154(b) by 573 days.

(21) Appl. No.: 17/608,579

(22) PCT Filed: May 9, 2019

(86) PCT No.: PCT/US2019/031502

§ 371 (c)(1),
(2) Date: Nov. 3, 2021

(87) PCT Pub. No.: WO2020/226652

PCT Pub. Date: Nov. 12, 2020

(65) Prior Publication Data

US 2022/0226831 A1 Jul. 21, 2022

(51) Int. Cl.
*B02C 4/32* (2006.01)
*B02C 4/02* (2006.01)
(Continued)

(52) U.S. Cl.
CPC .................. *B02C 4/32* (2013.01); *B02C 4/02* (2013.01); *B02C 4/28* (2013.01); *B02C 4/42* (2013.01); *B02C 4/423* (2013.01); *B02C 4/426* (2013.01)

(58) Field of Classification Search
CPC .... B02C 4/02; B02C 4/28; B02C 4/32; B02C 4/42; B02C 4/423; B02C 4/426
See application file for complete search history.

(56) References Cited

U.S. PATENT DOCUMENTS 553,391 A * 1/1896 Kazin ........................ B02C 4/32 241/230
1,409,869 A * 3/1922 Krider ........................ B02C 4/12 241/289
(Continued)

FOREIGN PATENT DOCUMENTS

CL 202001205 10/2020
CL 202001225 10/2020
(Continued)

OTHER PUBLICATIONS

Extended European Search Report for European Patent Application No. 19927803.7, dated Jun. 22, 2023.
(Continued)

*Primary Examiner* — Christopher L Templeton
*Assistant Examiner* — Matthew Stephens
(74) *Attorney, Agent, or Firm* — Andrus Intellectual Property Law, LLP

(57) ABSTRACT

Disclosed is a deflection distributor refitting kit for a roller crusher. According to the disclosure the deflection distributor refitting kit comprises a deflection distributing shaft, thrust rods each having first and second ends and mounts for attachment of the deflection distributing shaft at a frame of the roller crusher, wherein a first end of each of said thrust rods is attached to the deflection distributing shaft via a lever, wherein a second end of each of the thrust rods is arranged to be attached to a movable bearing housing of the roller crusher, and wherein the deflection distributor refitting kit further comprises a preload arrangement which induces a bias to parts of the deflection distributor refitting kit. Also disclosed is a method for mounting the deflection distributor refitting kit, as well as a roller crusher comprising a deflection distributor.

29 Claims, 15 Drawing Sheets

(51) Int. Cl.

| | |
|---|---|
| ***B02C 4/28*** | (2006.01) |
| ***B02C 4/42*** | (2006.01) |

(56) References Cited

U.S. PATENT DOCUMENTS

| | | | | |
|---|---|---|---|---|
| 2,104,213 | A | 1/1938 | Umlauff | |
| 2,537,779 | A | 1/1951 | Mclain | |
| 2,969,661 | A | 1/1961 | Swanson | |
| 4,357,287 | A | 11/1982 | Schonert | |
| 4,442,980 | A | 4/1984 | Oetiker et al. | |
| 4,789,376 | A | 12/1988 | Grant | |
| 4,838,494 | A | 6/1989 | Jakobs | |
| 5,027,491 | A * | 7/1991 | Sidney, Jr. | B30B 3/005 241/230 |
| 5,072,887 | A | 12/1991 | Thom, Jr. | |
| 5,632,063 | A | 5/1997 | Carper | |
| 6,502,773 | B1 | 1/2003 | Hostettler et al. | |
| 6,685,118 | B1 * | 2/2004 | Williams, Jr. | B02C 23/12 241/285.3 |
| 9,498,779 | B2 | 11/2016 | Brendler et al. | |
| 11,607,692 | B2 | 3/2023 | Grönvall | |
| 2005/0063807 | A1 | 3/2005 | Martin | |
| 2012/0056027 | A1 | 3/2012 | Euculano | |
| 2012/0111982 | A1 | 5/2012 | Ruther et al. | |
| 2013/0277478 | A1 | 10/2013 | Gronvall | |
| 2016/0243556 | A1 * | 8/2016 | Giesemann | B02C 23/18 241/230 |
| 2017/0298957 | A1 | 10/2017 | Howe | |
| 2021/0170418 | A1 * | 6/2021 | Grönvall | B02C 4/02 241/230 |

FOREIGN PATENT DOCUMENTS

| | | | |
|---|---|---|---|
| CL | 202102921 | | 8/2022 |
| CL | 202102937 | | 8/2022 |
| CL | 202102938 | | 8/2022 |
| CN | 201482515 | U | 5/2010 |
| CN | 203648595 | U | 6/2014 |
| CN | 105032546 | A | 11/2015 |
| CN | 109046560 | A | 12/2018 |
| CN | 109126960 | A | 1/2019 |
| DE | 1927164 | A1 | 12/1970 |
| DE | 10 2015 110 033 | A1 | 12/2016 |
| DE | 202016101206 | U1 | 6/2017 |
| WO | 2019093954 | A1 | 5/2019 |
| WO | 2020226651 | | 11/2020 |
| WO | 2020226652 | | 11/2020 |
| WO | 2020226653 | | 11/2020 |

OTHER PUBLICATIONS

Search Report and Examination Report for Chilean Patent Application No. 202102937, dated Jul. 13, 2023.

Extended European Search Report for European Patent Application No. 19927935.7, dated Jul. 21, 2023.

International Search Report and Written Opinion for International Application No. PCT/US2019/031502 mailed Aug. 7, 2019.

Examination Report for Canadian Patent Application No. 3, 139,936, dated Jan. 9, 2024.

Examination Report for Canadian Patent Application No. 3,139,075, dated Jan. 10, 2024.

Examination Report for Canadian Patent Application No. 3, 139,077, dated Jan. 9, 2024.

Extended European Search Report for European Patent Application No. 19927656.9, mailed Jun. 12, 2023.

Search and Examination Report for Chilean Patent Application No. 202102921, mailed Apr. 28, 2023.

Search and Examination Report for Chilean Patent Application No. 202102937, mailed Apr. 24, 2023.

Search and Examination Report for Chilean Patent Application No. 202102938, mailed Apr. 27, 2023.

International Search Report and Written Opinion for PCT/US2019/031510, mailed Jul. 26, 2019.

* cited by examiner

CRUSHING DEVICE

CROSS-REFERENCE TO RELATED APPLICATIONS

This application is the U.S. national stage application of International Application PCT/US2019/031502, filed May 9, 2019, which international application was published on Nov. 12, 2020, as International Publication WO 2020/226652 A1 in the English language.

FIELD OF THE INVENTION

The present invention relates to a crushing device, especially a roller crusher where two, generally parallel rollers are separated by a gap and rotate in opposite directions and especially to a high pressure roller crusher and a system for deflection distribution in such high pressure roller crushers.

BACKGROUND OF THE INVENTION

When crushing or grinding rock, ore, cement clinker and other hard materials, roller crushers may be used having two generally parallel rolls which rotate in opposite directions, towards each other, and which are separated by a gap. The material to be crushed is then fed into the gap. One type of roller crusher is called high pressure grinding rollers or high pressure roller crushers. This type of comminution has been described in U.S. Pat. No. 4,357,287 where it was established that it is in fact not necessary to strive for single particle breakage when trying to achieve fine and/or very fine comminution of material. Quite opposite, it was found that by inducing compression forces so high that briquetting, or agglomeration of particles occurred during comminution, substantial energy savings and throughput increases could be achieved. This crushing technique is called interparticle crushing. Here, the material to be crushed or pulverized is crushed, not only by the crushing surfaces of the rolls, but also by particles in the material to be crushed, hence the name interparticle crushing. U.S. Pat. No. 4,357,287 specifies that such agglomeration can be achieved by using much higher compression forces then what was previously done. As an example, forces up to 200 kg/cm2 where previously used, whereas the solution in U.S. Pat. No. 4,357,287 suggests to use forces of at least 500 kg/cm2 and up to 1500 kg/cm2. In a roller crusher having a roller diameter of 1 meter, 1500 kg/cm2 would translate into a force of more than 200 000 kg per meter length of the rollers whereas previously known solutions could, and should, only achieve a fraction of these forces. Another property of the interparticle crushing is that a roller crusher should be choke fed with the material to be crushed, meaning that the gap between the two opposed rolls of the roller crusher should always be filled with material along the entire length thereof and there should also always be material filled to a certain height above the gap to keep it full at all times and to maintain a state of particle-on-particle compression. This will increase the output and the reduction to finer material. This stands in sharp contradiction to older solutions where it was always emphasized that single particle breaking was the only way fine and very fine particle comminution could be obtained.

Interparticle crushing, as opposed to some other types of crushing equipment, such as e.g. sizers, has the attribute that it does not create a series of shocks and very varying pressure during use. Instead, equipment using interparticle crushing is working with a very high, more or less constant pressure on the material present in the crushing zone created in and around the gap between the rolls.

In this type of roller crusher, the gap width is created by the pressure of the feed material's characteristics. The movement of the crushing rolls away from each other is controlled with a hydraulic system comprising hydraulic cylinders and accumulators, which accumulators provide a spring action to handle varied material feed characteristics. For example, a higher material feed-density to the roller crusher will normally cause a greater gap width than a lower material feeding-density would and uneven feed characteristics, such as non-uniform material feed distribution, along the length of the crusher rolls will cause the gap width to differ along the length of the crusher rolls, i.e. creating a skew. Such uneven feed characteristics may be caused by uneven feed of the amount of material along the length of the crusher rolls, but may also be caused by different bulk density within the feed material, varying particle size distribution within the feed material, varying moisture content within the feed, and diversity of mineral breaking strength in material feed, but also by uncrushable material, which may enter into the feed material. There have been attempts made to avoid this skewing problem but these attempts have typically resulted in complicated systems.

SUMMARY OF THE INVENTION

An object of the invention is to overcome, or at least lessen the above mentioned problems. A particular object is to provide a deflection distributor refitting kit for a roller crusher. To better address this concern, in a first aspect of the invention there is provided a deflection distributor refitting kit for a roller crusher, comprising a deflection distributing shaft and thrust rods, each thrust rod having first and second ends. Further, mounts for attachment of the deflection distributing shaft at a frame of the roller crusher are provided and a first end of each of the thrust rods is attached to the deflection distributing shaft via a lever. A second end of each of the thrust rods is arranged to be attached to a movable bearing housing of the roller crusher. The deflection distributor refitting kit further comprises a preload arrangement which induces a bias to parts of the deflection distributor refitting kit. This structure has the advantage that a mechanical connection between the bearing housings arranged at respective sides of the moveable crusher roll is created and in that the wear and tear of this mechanical connection is reduced. This, in turn, means that any uneven feed along the length of the crushing gap may immediately be compensated for such that the moveable crusher roll will always be kept in parallel with the fixed crusher roll such that problems due to skewing can be avoided. Skew can be defined as a difference in gap width when measured at the two opposite ends of the crusher rolls. Skew may also be defined in terms of gap width difference per length unit, e.g. mm/m or in terms of the angle between the central axis of the first roll and of the second roll. Herein, skew is defined as a difference in gap width when measured at the two opposite ends of the crusher rolls. Skewing of the equipment causes undesirable load situations in the roller crusher. The framework of these roller crushers are typically built to endure linear forces perpendicular to the longitudinal axis of the crusher rolls and skewing of the rolls will create forces that the framework is not suited to handle. Further, the moveable bearing housings of the moveable crusher roll often run on a guiding structure and in situations where skewing occur, there is a risk that the moveable bearing housing will cause jamming in the guiding structure and get stuck, thus being unable to respond to any required reciprocating movement. Needless to say, the skewing will cause unproportioned wear of the structure of the roller crusher. Considering the fact that the compression forces applied in equipment of the present invention may amount to 20 MN per meter crusher roll, any occurring skewing will have very negative impact on the affected parts. Further, tramp material (uncrushable) may find its way into the material feed and needs to pass between the crusher rolls which requires that the gap width is momentarily widened. Such tramp material will hit the crusher rolls at random points of the crusher rolls. This means that skewing also may occur when tramp material enters the gap. However, as indicated above, the main reason behind the skewing of the crushing rolls in roller crushers relates to a non-uniform material feed along the length of the crushing gap, different bulk density in the feed, varying particle size in the feed, or varying moisture content in the feed along the length of the crushing gap. The deflection distributor of the present invention will compensate for this and transfer any unbalanced loads between the two sides of the moveable crusher roll such that a parallel movement thereof can be ensured. Previously known attempts at solving this problem involve complicated hydraulic systems and one major drawback of such systems is the fact that they are unable to respond sufficiently fast. In order to compensate for a typical uneven material load situation, it is necessary to move a substantial amount of hydraulic oil within a fraction of a second. This is of course extremely hard to achieve, especially when considering the fact that, in addition to the oil transportation as such, such system first has to measure how much oil must be transported to compensate for the uneven load case. On the other hand, the deflection distributor of the present invention has no difficulties in handling these large loads and short time spans. The deflector distributor refitting kit of the disclosed invention further ensures the maintaining of a constant feed pressure profile within the roller crusher, which is not enabled by the prior art roller crushers and the systems for uneven feed characteristics therein. By providing a preload arrangement that induces a bias into parts of the deflection distributor refitting kit, wear and tear of the mechanical connection between the bearing housings arranged at respective sides of the moveable crusher roll can be reduced. During the process of grinding material in a roller crusher, vibrations occur. These vibrations are caused by the impact loads that occur when material of different properties are nipped, crushed, and discharged from the machine. Thus, even at normal and even optimal conditions, the equipment of a roller crusher is subjected to vibrations. These vibrations are detrimental to the equipment and the bearings of the deflection distributor refitting kit may have clearance, or play, between e.g. a bearing and a mounting pin extending into the bearing, e.g. for attaching a thrust rod thereto. The vibrations in combination with the clearance will cause shock loads to the bearings and the pins and this lead to premature failure of the parts. The preload arrangement of the present invention will make sure that for example a pin inserted into a bearing will be biased towards an inner surface of the bearing such that when load from vibration occurs, the pin is already in contact with an inner surface of the bearing, thus avoiding that a shock load is avoided when the outer surface of the pin hits the inner surface of the bearing.

In accordance with an embodiment of the deflection distributor refitting kit, the bias comprises a compression load to a first of the thrust rods in a direction generally parallel to a longitudinal direction of the first thrust rod and a tension load to a second thrust rod in a direction generally parallel to a longitudinal direction of the second thrust rod. This solution makes it possible to apply a bias to the system that is maintained as long as the rolls of the roller crusher are parallel. The bias is not strong enough to actually create a skew of the moveable roller even though it will induce forces that work in such direction, i.e. skewing the roll.

In accordance with an embodiment of the deflection distributor refitting kit, the bias comprises compression load to the thrust rods in a direction generally parallel to a longitudinal direction of each of the thrust rods. Such load can e.g. be achieved by applying a rotational force to the deflection distributing shaft in a direction forcing the moveable roll towards the fixed roll. This solution will in an effective manner reduce the detrimental effect of forces compressing the thrust rods.

In accordance with an embodiment of the deflection distributor refitting kit, the bias comprises a tension load to both thrust rods in a direction generally parallel to a longitudinal direction of each of the thrust rods. Such load can e.g. be achieved by applying a rotational force to the deflection distributing shaft in a direction forcing the moveable roll away from the fixed roll. This solution will in an effective manner reduce the detrimental effect of forces tensioning the thrust rods.

In accordance with an embodiment of the deflection distributor refitting kit, the bias comprises a load applied to at least one the thrust rods in a direction generally perpendicular to a longitudinal direction of the thrust rod. This solution is a good compromise since it will reduce the effects of vibrations occurring in a compression direction as well as in a tensioning direction of the thrust rods. By exerting a force perpendicular to a longitudinal direction of the thrust rod, any clearance between e.g. a pin and an inner surface in a vertical direction, assuming that the thrust rods extend in a generally horizontal direction, will be removed. If, then, a force from e.g. vibrations is applied in a direction generally parallel to a longitudinal direction of each of the thrust rods, the pin will not hit the inner wall of the bearing but instead it will ride along the inner surface of the bearing and the shock load can be avoided or at least reduced. This solution has the advantage that it works equally good for vibrations in all directions generally parallel to a longitudinal direction of the thrust rods.

In accordance with an embodiment of the deflection distributor refitting kit, the preload arrangement comprises a spring element. A spring element is a reliable and cost effective way of achieving a pre-load.

In accordance with an embodiment of the deflection distributor refitting kit, the spring element is arranged to be mounted between a moveable bearing housing and at least one of the thrust rods.

In accordance with an embodiment of the deflection distributor refitting kit, the mounts are arranged for attachment to the frame of the roller crusher.

In accordance with an embodiment of the deflection distributor refitting kit, the deflection distributing shaft is rotatably suspended in the mounts. By arranging the deflection distributing shaft rotatably in the frame, forces can be distributed from one side of the roller crusher to the other by means of a torsional movement of the deflection distributing shaft. A deflection distributing shaft can be made to have a high torsional rigidity such that any occurring loads will be transmitted without delay or losses.

In accordance with an embodiment of the deflection distributor refitting kit, the deflection distributing shaft comprises at least two interconnectable sub-shafts. This structure has the advantage that the refitting kit provides easy maintenance and installation thereof.

In one embodiment of this first aspect, the at least two sub-shafts are interconnectable by means of a rigid coupling, and in one embodiment this rigid coupling comprises a bolt connection.

In one embodiment of this first aspect, the at least two sub-shafts are interconnectable by means of hydraulic or pneumatic pressure coupling, and in one embodiment the hydraulic pressure coupling is a hydraulic shrink disc connection.

In one embodiment of this first aspect, the two sub-shafts are interconnectable in by means of a safety coupling. One embodiment of this first aspect the safety coupling comprises a torsion safety release coupling. By providing a safety coupling between the two sub-shafts, the two sub-shafts may be released from each other should a major tramp event occur.

Further, by providing a hydraulic or pneumatic pressure coupling for the interconnection of the two sub-shafts, the release pressure may be tailored for the appointed roller crusher to which the deflection distributor refitting kit is to be installed.

In another embodiment the sub-shafts are of approximately the same length.

In accordance with an embodiment of the deflection distributor refitting kit, the deflection distributing shaft comprises a first and second shaft parts which are interconnected by means of a shock absorbing unit. This structure has the advantage that the refitting kit provides damping in case of sudden load spikes which would otherwise be detrimental to the equipment. It is noted that during normal production conditions, the damping unit will not be working and the first and second shaft parts will act as a single deflection distributing shaft and only excessive load spikes will cause the shock absorbing unit to work.

In accordance with an embodiment of the deflection distributor refitting kit, the shock absorbing unit is arranged to damp a relative torsional movement between the first and second shaft parts.

In accordance with an embodiment of the deflection distributor refitting kit, the shock absorbing unit has an adjustable damping and/or spring rate.

In accordance with an embodiment of the deflection distributor refitting kit, the shock absorbing unit comprises a pneumatic or hydraulic damper.

In accordance with an embodiment of the deflection distributor refitting kit, the shock absorbing unit comprises a check valve.

In accordance with an embodiment of the deflection distributor refitting kit, the shock absorbing unit comprises a torque coupling comprising one or more elastomeric elements.

In accordance with an embodiment of the deflection distributor refitting kit, the elastomeric elements are precompressed.

In accordance with an embodiment of the deflection distributor refitting kit, the elastomeric elements are incompressible and wherein a shock absorbing effect is achieved by deformation of the elastomeric elements.

In accordance with an embodiment of the deflection distributor refitting kit, the shock absorbing unit is arranged in the connection between the first and second shaft parts.

In accordance with an embodiment of the deflection distributor refitting kit, the shock absorbing unit is arranged external to the deflection distributing shaft.

In accordance with an embodiment of the deflection distributor refitting kit, each first and second shaft part comprises a lever and wherein the shock absorbing unit is attached to each of said levers.

In accordance with an embodiment of the deflection distributor refitting kit, the lever comprises a shank extending from the deflection distributing shaft. The lever will convert the mainly linear movement of one of the thrust rods into rotary movement of the deflection distributing shaft and back to a mainly linear movement of the other thrust rod.

In accordance with an embodiment of the deflection distributor refitting kit, the lever comprises the off-center mounting of the thrust rods to the deflection distributing shaft.

In accordance with an embodiment of the deflection distributor refitting kit, rotational bearings are arranged between said deflection distributing shaft and said mounts. In one embodiment the mounts comprise rotational bearings, and in one embodiment rotational bearings are arranged in the deflection distributing shaft.

In accordance with an embodiment of the deflection distributor refitting kit, the rotational bearings comprise spherical bearings.

In accordance with an embodiment of the deflection distributor refitting kit, the first end of each of the thrust rods is attached to the lever by a pivot bracket. A pivoting joint between the lever and the thrust rod will ensure that the mainly linear movement of the thrust rod is transferred to the lever and thus the deflection distributing shaft without bringing about unnecessary torsional loads in the thrust rod or lever.

In accordance with an embodiment of the deflection distributor refitting kit, the second end of each of the thrust rods is arranged to be attached to the movable bearing housing by a pivot bracket. A pivoting joint between the bearing housing and the thrust rod will ensure that the linear movement of the bearing housing is transferred to the thrust rod without bringing about unnecessary torsional loads in the thrust rod or bearing housing.

In accordance with an embodiment of the deflection distributor refitting kit, the thrust rods are arranged to be fixedly attached to the bearing housings. A fixed connection involves less moveable parts, is less labor-intensive and is less prone to wear in comparison with moveable connections. A fixed connection provides a different buckling load than a pivot bracket, and this enables the use of decreased wall thickness of the thrust rods and/or thickness of material for the fixed connection.

In accordance with an embodiment of the deflection distributor refitting kit, the thrust rods are attached to said levers by means of semi-spherical slide bearings. A semi-spherical slide bearing constitutes a very good compromise between rigidity while still allowing for pivoting movement between the lever and the thrust rod, thereby reducing or avoiding creating torsional loads in the connection.

In accordance with an embodiment of the deflection distributor refitting kit, it further comprises at least one replacement roll for a roll crusher. The roll has a flange attached to each end of thereof, and the flanges extend in a radial direction of the roll and has a height above an outer surface of the roll. By providing flanges at both ends of one of the crusher rolls, it is possible to create a more efficient and uniform roll feed entry. The flanges will allow for material being fed such that a preferred material pressure is created over the entire length of the crusher rolls. It has been shown that it is possible to increase capacity of a given roller crusher with up to 20%, or sometimes even more, by using flanges. A general problem associated with grinding rollers without flanges is that the ratio between the roller diameter and the roller width is very important due to a significant edge effect, i.e. the crushing result is reduced at the edges of the rollers. This is because of the fact that material can escape over the edges of the rollers thereby reducing the crushing pressure on the material towards the gap at the edges of the rollers. Without flanges, it is thus necessary to recycle both material escaping the rolls and some of the material having passed the gap at the edges of the crusher rolls due to a lower pressure resulting in reduced breakage at the edges. Here, the combination of the deflection distribution that is created by the present invention and flanges is very beneficial. By ensuring that the moveable crusher roll always remain in parallel with the fixed crusher roll, the sealing properties of the flanges can be maintained at all times. Skewing, as it occurs in prior art solutions, will require a large distance between the flange and non-flanged rolls to avoid the skewing breaking the flanges and that will reduce the efficiency of the flanges. Further, the innovative combination of flanges on one of the crusher rolls and the deflection distributor ensuring constantly keeping the crusher rolls in parallel during all possible inconsistency of material feed, will provide for a unique flat tire wear profile. Thus, the surface of the roller crusher will be worn equally along the surface thereof, and this will optimize the breakage efficiency during the full tire wear life and is essential for the optimized use of the wear surface over the full width of the roll, hence increasing the lifetime of the roll and by that also improve the uptime of the crusher. The fact that the crusher rolls are kept parallel at all time also allows for the use of a thicker wear profile in comparison with prior art solutions. Such prior art solutions where the roller feed is not uniform over the length of the crusher rolls will cause higher wear rates towards the middle of the crusher rolls, causing what is known as the “bathtub effect”, i.e. the crusher rolls will wear down faster towards the middle than towards the ends thereof and create a wear profile having a central depression. This depression will in turn lead to lower material pressure in this region thereby causing unfavorable crushing results, which means that the crusher rolls need replacement or renovation. Thus, there is no point in making the wear surface as thick as possible since the bathtub effect at some point will force the roller crusher to be shut down. In the present invention, on the other hand, the bathtub effect is avoided and the wear thickness can be increased, thus increasing uptime considerably. Further, the deflection distributor refitting kit ensures maintained feed pressure profile, which limits the recirculation of material which has not been crushed to the correct particle size.

In accordance with an embodiment of the deflection distributor refitting kit, the flange extends in a radial direction of the roller, and has a height above an outer surface of the roller. This height preferably is sufficient to extend across the gap substantially along a nip angle of the roller crusher. This is advantageous in that the flange eliminates the weakness spot at the edge of the rollers. The flange will help maintaining the material on the outer roller surface. That is to say, due to the flange, the material is prevented from falling over the edge of the roller. This will in turn help increasing the pressure on the material towards the gap between the rollers at the edge of the rollers. Thus, a U-shaped grinding chamber is provided by the roller surface and flanges on each side. In one embodiment, the flange comprises a wear lining on the inside of the flange. This wear lining provides a friction engagement with the feed in order to push the feed towards the gap between the rollers. This is advantageous in that the structure will help increasing the pressure on the material towards the gap between the rollers at the edge of the roller even further. The structure will engage with the material which will be moved inside the crushing area and the pressure will be optimized. Thus, the wear lining works as a feeding structure.

Thus, according to one embodiment of the deflection distributor refitting kit, the flange comprises a feeding structure on the inside of the flange.

In accordance with an embodiment of the deflection distributor refitting kit, it further comprises replacement bearing housings for the crusher rolls. These replacement bearing housings may be adapted for the use with the deflection distributor according to the disclosed invention and may make the assembly work less labor intensive.

In accordance with an embodiment of the deflection distributor refitting kit, it further comprises replacement bearings for the crusher rolls. Again, these replacement bearings may be adapted for the use with the deflection distributor according to the disclosed invention and may make the assembly work less labor intensive.

In accordance with an embodiment of the deflection distributor refitting kit, it further comprises replacement bearings and replacement bearing housings for the crusher rolls. Again, these replacement bearings and replacement bearing housings may be adapted for the use with the deflection distributor according to the disclosed invention and may make the assembly work less labor intensive. As the crusher rolls will be kept in parallel irrespectively of uneven load profile along the length of the crushing gap, the design of the bearing housing sealing and internal bearing sealings may be less complicated. Further, the bearings may be changed from spherical bearings into standard bearings. Again, this is enabled by the securing of a parallel movement of the second crusher roll irrespectively of uneven load profile and/or tramp along the length of the crushing gap.

In accordance with an embodiment of the deflection distributor refitting kit, the deflection distributing shaft has a shape and profile, which minimizes deformation thereof. The deflection distributing shaft may have a non-uniform cross-section along the length thereof. It may for example have a wide cross-sectional area in the center thereof and decrease in cross-sectional area closer to the first and second end thereof. In one embodiment of the deflection distributor refitting kit, the deflection distributing shaft is rigid.

In one embodiment of the deflection distributor refitting kit, the deflection distributing shaft has torque resistant profile.

In one embodiment of the deflection distributor refitting kit, the deflection distributing shaft is made of steel.

In one embodiment of the deflection distributor refitting kit, the deflection distributing shaft is made of composite material.

In accordance with an embodiment of the deflection distributor refitting kit, the deflection distributing shaft is cylindrical and has a diameter of between 200 to 1000 mm.

In accordance with an embodiment of the deflection distributor refitting kit, the deflection distributing shaft is hollow and has a wall thickness of 10 to 200 mm.

In accordance with an embodiment of the deflection distributor refitting kit, at least one accumulator is arranged to be connected to the hydraulic system of the roller crusher, the at least one accumulator acting as a spring in the hydraulic system of the roller crusher is provided. This spring function can possibly be improved by arranging a pressurized gas chamber therein, using e.g. nitrogen, air, or other suitable gas. In some embodiments, such pressurized gas can be replaced by a steel spring or similar. By providing such accumulators acting as springs which are dedicated specifically to the deflection distributor refitting kit, it is possible to obtain better function and performance. For example, they can be arranged at suitable positions and they can also be tuned to function optimally with the deflection distributor refitting kit, for example taking into consideration the extremely quick responses provided by the refitting kit in comparison with known systems.

In accordance with an embodiment of the deflection distributor refitting kit, the at least one accumulator is arranged at the mounts for attachment of the deflection distributing shaft to the frame of the roller crusher. By arranging the accumulator at the mounts, it is possible to provide the thrust rods and the deflection distributing shaft with a high range of movement without interfering with the accumulator.

In accordance with an embodiment of the deflection distributor refitting kit, end supports are provided which are arranged to be mounted at the frame of the roller crusher at the first and second sides thereof. By providing dedicated end supports, it is possible to provide best possible conditions for the deflection distributor refitting kit, e.g. by providing free passage for the thrust rods, by improving the rigidity of the frame for the roller crusher, or by providing attachment points for accumulators for the hydraulic system of the roller crusher.

In accordance with an embodiment of the deflection distributor refitting kit, thrust rods are arranged to pass by/through said end supports.

In accordance with an embodiment of the deflection distributor refitting kit, a spring element is provided on at least one of the end supports and is arranged to exert a bias on a corresponding thrust rod in a direction generally perpendicular to a longitudinal direction of said thrust rod. This is a simple way of achieving the bias on the thrust rod having the advantages described earlier.

In accordance with an embodiment of the deflection distributor refitting kit, the preload arrangement comprises a hydraulic or a pneumatic arrangement. A hydraulic or pneumatic arrangement has the advantage that it can easily be adjusted to different requirements, both in direction of the bias and in the strength of the bias.

In accordance with an embodiment of the deflection distributor refitting kit, the mounts for the deflection distributor shaft are mounted to or arranged in the end supports.

In accordance with an embodiment of the deflection distributor refitting kit, the thrust rods can pass by or pass through the end supports. By letting the thrust rods pass by or even through the end supports, optimal function of the deflection distributor refitting kit is supported.

In accordance with an embodiment of the deflection distributor refitting kit, each of the end supports comprises a channel through which a respective thrust rod may extend. By letting the thrust rods pass through the end supports, the thrust rods can maintain a simple and straight-forward construction.

In accordance with an embodiment of the deflection distributor refitting kit, the end supports are arranged to be coupled to at least one hydraulic cylinder of the hydraulic system of the roller crusher.

In accordance with an embodiment of the deflection distributor refitting kit, the channel is arranged between two coupling points for said hydraulic cylinders, preferably midway between two coupling points. This allows for desirable deflection distribution within the roller crusher. When the channel is arranged between two hydraulic cylinders, the loads can be balanced and they can also be distributed in the same vertical plane, thereby avoiding, or minimizing formation of torsional forces in the frame of the roller crusher. This arrangement also provides excellent access to the components, both those of the hydraulic system but also to the thrust rods and other parts of the deflection distributor refitting kit.

In accordance with an embodiment of the deflection distributor refitting kit, a cross bar arranged to extend between the moveable bearing housings is provided and the second end of each of the thrust rods is arranged to be attached to the cross bar. This allows for more flexibility when it comes to the location of the thrust rods. They can be attached to the crossbar anywhere along the length thereof.

In accordance with an embodiment of the deflection distributor refitting kit, the crossbar is arranged to be pivotably connected to each of the moveable bearing housings. A pivotal connection has the advantage that it can accommodate for differentiating movements of the moveable bearing housings.

In accordance with an embodiment of the deflection distributor refitting kit, the second end of each of the thrust rods is pivotably attached to the crossbar. Again, pivotal connection allows for accommodation and compensation of varying movements of adjacent parts with no or at least less torque build-up.

In accordance with an embodiment of the deflection distributor refitting kit, each of the thrust rods is arranged offset from a corresponding end support such that each of said thrust rods is arranged to pass alongside the end supports. This solution has the advantage that the thrust rods can pass by the end supports without having to arrange for end supports having an opening therethrough. Instead, they will pass alongside the end supports. Sometimes, it is inconvenient to arrange end supports with an opening, since there might be electric wiring or hydraulic hoses or pipes arranged on or within the end supports. With this offset solution for the thrust rods, previous end supports can be maintained and no re-routing or rearrangement of wires, hoses, pipes, installations or similar is necessary.

In accordance with an embodiment of the deflection distributor refitting kit, the deflection distributing shaft passes alongside a respective inner surface of each end support. This provides for a very compact solution with minimal footprint.

In accordance with an embodiment of the deflection distributor refitting kit, an offset bracket is arranged to be mounted at each of the moveable bearing housings and the second end of each thrust rod is connected to a corresponding offset bracket. The offset arrangement of the thrust rods can be achieved in a reliable manner by using such an offset bracket.

In accordance with an embodiment of the deflection distributor refitting kit, the first end of each of the thrust rods is attached to the lever via a lever arm. The provision of a lever arm allows for the use of the deflection distributor refitting kit without any substantial modification of the roller crusher as such. Furthermore, it provides beneficial load situations of the construction.

In accordance with an embodiment of the deflection distributor refitting kit, at least one lever arm is provided for each side of the roller crusher. A centrally arranged lever arm would be conceivable within the scope of the present invention. One arm for each side of the roller crusher does, however, provide better load distribution and better access to the equipment.

In accordance with an embodiment of the deflection distributor refitting kit, at least two lever arms are provided for each side of the roller crusher.

In accordance with an embodiment of the deflection distributor refitting kit, a first portion of the lever arm is arranged to be connected to the frame of the roller crusher and a second portion of the lever arm is connected to said lever.

In accordance with an embodiment of the deflection distributor refitting kit, the first end of each of the thrust rods is attached to the lever arm at a position between the first portion and the second portion.

In accordance with an embodiment of the deflection distributor refitting kit, the first portion of the lever arm is arranged to be pivotally connected to a lower part of the frame of the roller crusher and the second portion is pivotally connected to the lever.

In accordance with an embodiment of the deflection distributor refitting kit, a control system is provided. The control system being configured to monitor a skew between the first and second crusher rolls and wherein the control system is further configured to reduce pressure in the hydraulic system on the first or second side in response to a determination that the skew exceeds a predefined threshold value. The provision of a control system according to this embodiment of the present invention in combination with the deflection distributor reduces the forces acting on the deflection distributor such that the structural dimensions of the parts can be reduced and focus on achieving maximum rigidity can be reduced without sacrificing anti-skewing properties. In accordance with this embodiment of the present invention, no complicated hydraulic control systems are required. Instead, in response to a determined exceeding of a predefined threshold skew value, it is sufficient to just reduce the pressure in the hydraulic system on the least deflected side. Such pressure reduction can be achieved by simply opening a valve with sufficient area such that hydraulic liquid can be drained from the system into suitable container. When the skewing is reduced below the threshold value, the valve is closed and hydraulic liquid may be returned into the system.

According to a second aspect of the invention, there is provided a method for mounting a deflection distributor refitting kit to a roller crusher. The roller crusher comprises a frame and first and second crusher rolls which are arranged axially in parallel with each other. The first crusher roll is supported in bearing housings which are arranged in the frame and the second crusher roll is supported in bearing housings which are configured to be movable. The roller crusher further comprises a hydraulic system which is configured to adjust the position of the second crusher roll and the crushing pressure between the two crusher rolls. The method comprises the steps of attaching the second ends of the thrust rods to the movable bearing housings respectively and attaching the mounts for the deflection distributing shaft at the frame, attaching the preload arrangement and inducing a bias to parts of the deflection distributor refitting kit by means of a preload arrangement. Similarly, and correspondingly to the refitting kit, the method of the present invention will provide substantial advantages over prior art solutions.

In accordance with an embodiment of the method for mounting a deflection distributor refitting kit, the method comprises the steps of attaching the second ends of the thrust rods to the movable bearing housings respectively and attaching the mounts for each sub-shaft at the frame; connecting the respective sub-shafts to their respective mounts and trust rods; and interconnecting the sub-shafts. Similarly, and correspondingly to the refitting kit, the method of the present invention will provide substantial advantages over prior art solutions.

In accordance with an embodiment of the method for mounting a deflection distributor refitting kit, the first and second crusher rolls are arranged axially in parallel with each other by pushing the second crusher roll towards the first crusher roll by means of the hydraulic system.

In accordance with another embodiment of the method for mounting a deflection distributor refitting kit, the method comprising attaching the deflection distributing shaft at said frame by means of the mounts, said deflection distributing shaft comprising first and second shaft parts which are interconnected by means of a shock absorbing unit.

In accordance with an embodiment of the method for mounting a deflection distributor refitting kit, the deflection distributor refitting kit is mounted in parallel to the hydraulic system of the roller crusher. The term "in parallel to the hydraulic system" means that the two systems are functionally in parallel with each other. By arranging the deflection distributor refitting kit in parallel with the hydraulic system, the deflective properties and the long response period of the hydraulic system are not affecting the deflection properties of the deflection distributor kit. This provides for a much higher responsiveness of the system where the inherent structural rigidity of the deflection distributor kit can excel and react to uneven loads occurring at the crusher rolls much quicker than systems relying on the response of the hydraulic system.

In accordance with an embodiment of the method for mounting a deflection distributor refitting kit, the hydraulic system of the roller crusher comprises two hydraulic cylinders for each movable bearing housing on the respective sides of the second crusher roll. Each of the thrust rods is arranged between, preferably midway, the two hydraulic cylinders on the respective side of the second crusher roll. When the thrust rod is arranged between two hydraulic cylinders, the loads can be balanced and they can also be distributed in the same vertical plane, thereby minimizing formation of torsional forces in the frame of the roller crusher.

In accordance with an embodiment of the method for mounting a deflection distributor refitting kit, each of the thrust rods has a longitudinal axis perpendicular to a central axis of the second crusher roll. By arranging the thrust rods perpendicular to a central axis of the second crusher roll, the balancing of occurring forces is improved even further and it will ensure that loads occurring in the roller crusher will run in a direction perpendicular to a central axis of the second crusher roll. This is beneficial given the structure of the frame of most roller crushers, which are best suited for handling forces in longitudinal direction of the roller crusher, i.e. perpendicular to a central axis of the second crusher roll.

In accordance with an embodiment of the method for mounting a deflection distributor refitting kit, each of the thrust rods is attached to the bearing housings such that the general longitudinal central axes of the thrust rods lie in a same plane as the longitudinal central axis of the crusher roll, i.e. they lie at the same height. This ensures that the forces originating from the crusher rolls acting on the bearing housings can be transmitted to the thrust rods without creating any rotation of the bearing housings. Considering the fact that the forces in equipment of the present invention may amount to 10 MN per bearing housing, this is an important advantage of the invention.

In accordance with an embodiment of the method for mounting a deflection distributor refitting kit, each of the levers is attached to a first end of a respective thrust rod such that a longitudinal axis of the lever is arranged substantially perpendicular to a longitudinal axis of the thrust rod. This has the advantage that very limited bending of the thrust rod will occur during use of the equipment. The lever will perform its duties in a position at or near a perpendicular direction to the thrust rod and as such the thrust rod will move more or less linearly. If another arrangement would have been chosen, e.g. not substantially perpendicular, the thrust rod would have to bend to a larger extent during its stroke back and forth. This would be less beneficial and would require corresponding dimensioning of the thrust rods and the connections thereto.

In accordance with an embodiment of the method for mounting a deflection distributor refitting kit, the longitudinal axis of the lever passes through the central axis of the deflection distributing shaft and a pivotal point of the lever and the thrust rod.

In accordance with an embodiment of the method for mounting a deflection distributor refitting kit, a control system is mounted, wherein said control system is configured to monitor a skew of the first and second crusher rolls and wherein the control system further being configured to reduce pressure in said hydraulic system on the first or second side in response to a determination that the skew exceeds a predefined threshold value. As indicated above in relation to the deflection distributor refitting kit, this has several advantages, which apply correspondingly with respect to the method as well. Among others the dimensions of the deflection distributor refitting kit can be kept down without sacrificing anti-skewing properties.

According to a third aspect of the invention, there is provided a roller crusher. The roller crusher comprises a frame; first and second crusher rolls arranged axially in parallel with each other, said first crusher roll being supported in bearing housings which are attached in the frame, said second crusher roll being supported in bearing housings which are configured to be movable; and a hydraulic system configured to adjust the position of the second crusher roll and the crushing pressure between the two crusher rolls. According to this aspect of the invention the roller crusher further comprises a deflection distributor, wherein said deflection distributor comprises a deflection distributing shaft, mounts attaching said deflection distributing shaft at said frame of said roller crusher and thrust rods each having first and second ends, wherein a first end of each of said thrust rods is attached to said deflection distributing shaft via a lever, wherein a second end of each of said thrust rods is attached to a movable bearing housing of said second crusher roll and wherein a preload arrangement is arranged to induce a bias into a thrust rod or into the deflection distributing shaft. Similarly, and correspondingly to the refitting kit, the roller crusher of the present invention will provide substantial advantages over prior art solutions.

In one embodiment of the roller crusher, the deflection distributing shaft comprises at least two interconnected sub-shafts.

In one embodiment of the roller crusher, the deflection distributing shaft comprises at least three interconnected sub-shafts.

In accordance with an embodiment of the roller crusher, the two sub-hafts are interconnected by means of a rigid coupling.

In accordance with an embodiment of the roller crusher, the two sub-shafts are interconnected by means of a hydraulic or pneumatic pressure coupling.

In accordance with an embodiment of the roller crusher, the two sub-shafts are interconnected by means of a safety coupling.

In accordance with an embodiment of the roller crusher, the safety coupling comprises a torsion safety release coupling.

In accordance with an embodiment of the roller crusher, the rigid coupling comprises a bolt connection.

In accordance with an embodiment of the roller crusher, the hydraulic pressure coupling is a hydraulic shrink disc connection.

In accordance with an embodiment of the roller crusher, the deflection distributing shaft comprises first and second shaft parts which are interconnected by means of a shock absorbing unit.

In accordance with an embodiment of the roller crusher, the shock absorbing unit is arranged to damp a relative torsional movement between the first and second shaft parts.

In accordance with an embodiment of the roller crusher, the shock absorbing unit has an adjustable damping and/or spring rate.

In accordance with an embodiment of the roller crusher, the shock absorbing unit comprises a pneumatic or hydraulic damper.

In accordance with an embodiment of the roller crusher, the shock absorbing unit comprises a check valve.

In accordance with an embodiment of the roller crusher, the shock absorbing unit comprises a torque coupling comprising one or more elastomeric elements.

In accordance with an embodiment of the roller crusher, the elastomeric elements are pre-compressed.

In accordance with an embodiment of the roller crusher, the elastomeric elements are incompressible and wherein a shock absorbing effect is achieved by deformation of the elastomeric elements.

In accordance with an embodiment of the roller crusher, the shock absorbing unit is arranged in the connection between the first and second shaft parts.

In accordance with an embodiment of the roller crusher, the shock absorbing unit is arranged external to the deflection distributing shaft.

In accordance with an embodiment of the roller crusher, each of the first and second shaft parts comprises a lever and wherein the shock absorbing unit is attached to each of said levers.

In accordance with an embodiment of the roller crusher, the deflection distributor is connected to the second crusher roll in a manner parallel with the hydraulic system.

In accordance with an embodiment of the roller crusher, the movable bearing housings are arranged to be slidable movable in the frame.

In accordance with an embodiment of the roller crusher, the bearing housings of said first crusher roll are fixed in the frame of the roller crusher.

In accordance with an embodiment of the roller crusher, the mounts for the deflection distributing shaft are attached to the frame of the roller crusher.

In accordance with an embodiment of the roller crusher, the hydraulic system of the roller crusher comprises two hydraulic cylinders for each movable bearing on the respective sides of the second crusher roll, wherein each of the thrust rods is arranged between the two hydraulic cylinders on the respective side of the second crusher roll, preferably midway between the two hydraulic cylinders on the respective side of the second crusher roll. This achieves advantageous load distribution within the roller crusher.

In accordance with an embodiment of the roller crusher, a longitudinal axis of each of the thrust rods generally lies in a same plane as a longitudinal central axis of the second roll. Again, this provides for preferable load distribution with no or at least reduced torque build up in the roller crusher.

In accordance with an embodiment of the roller crusher, each of the levers is attached to a first end of a respective thrust rod such that a longitudinal axis of the lever is arranged substantially perpendicular to a longitudinal axis of the thrust rod. As indicated previously, this has several advantages, among others that the thrust rods do not have to bend, or at least to a reduced extent, during movement back and forth.

In accordance with an embodiment of the roller crusher, the longitudinal axis of the lever passes through the central axis of the deflection distributing shaft and a pivotal point of the lever and the thrust rod.

In accordance with an embodiment of the roller crusher, one roll of the first and second crusher rolls has a flange attached to each end thereof, and which flange extends in a radial direction of the roll and has a height above an outer surface of the roll.

In accordance with an embodiment of the roller crusher, the flange comprises a feeding structure on the inside of the flange.

In accordance with an embodiment of the roller crusher, the frame further comprises end supports.

In accordance with an embodiment of the roller crusher, the hydraulic system is arranged at least in part between said end supports and said moveable bearing housings and wherein said each of said thrust rods extends through a corresponding end support.

In accordance with an embodiment of the roller crusher, each of the thrust rods is arranged offset from the corresponding end support such that each of the thrust rods is arranged alongside of a corresponding end support.

In accordance with an embodiment of the roller crusher, a crossbar is arranged extending between the moveable bearing housings and wherein the second end of each of said thrust rods is attached to said movable bearing housing of said second crusher roll through said crossbar. The use of a crossbar allows for more flexibility when it comes to the location of the thrust rods. They can be attached to the crossbar anywhere along the length thereof.

In accordance with an embodiment of the roller crusher, the crossbar is pivotably connected to each of the moveable bearing housings.

In accordance with an embodiment of the roller crusher, the crossbar can be split in at least two parts. This allows for easier assembly and disassembly.

In accordance with an embodiment of the roller crusher, the second end of each of said thrust rods is pivotably attached to said crossbar. Such pivotable connections can accommodate and compensate for differing movements of parts interconnected through the crossbar without unnecessary torque build-up in the roller crusher.

In accordance with an embodiment of the roller crusher, each of the thrust rods is arranged offset from the corresponding end support such that each of the thrust rods passes alongside of the respective end supports. This solution has the advantage that the thrust rods can pass by the end supports without having to arrange for end supports having an opening therethrough. Instead, they will pass alongside the end supports. Sometimes, it is inconvenient to arranged end supports with an opening, since there might be electric wiring or hydraulic hoses or pipes arranged on or within the end supports. With this offset solution for the thrust rods, previous end supports can be maintained and no re-routing or rearrangement of wires, hoses, pipes, installation or similar is necessary.

In accordance with an embodiment of the roller crusher, each of the thrust rods is arranged offset inwardly from the corresponding end support such that each of said thrust rods is arranged to pass alongside an inner surface of the corresponding end support.

In accordance with an embodiment of the roller crusher, the deflection distributing shaft extends between a respective inner surface of each end support. This provides for a very compact solution with minimal footprint.

In accordance with an embodiment of the roller crusher, an offset bracket is arranged at each of the moveable bearing housings and the second end of each thrust rod is connected to the corresponding movable bearing housing through the corresponding offset bracket. The offset arrangement of the thrust rods can be achieved in a reliable manner by using such an offset bracket.

In accordance with other embodiments of the roller crusher, the deflection distributor may have the same features as the deflection distributor of the above-disclosed deflector distributor refitting kit.

In accordance with an embodiment of the roller crusher, the first end of each of the thrust rods is attached to the lever via a lever arm.

In accordance with an embodiment of the roller crusher, at least one lever arm is arranged at each side of the roller crusher.

In accordance with an embodiment of the roller crusher, a first portion of the lever arm is connected to the frame of the roller crusher and a second portion of the lever arm is connected to the lever.

In accordance with an embodiment of the roller crusher, the first end of each of the thrust rods is connected to the lever arm at a position between the first portion and the second portion.

In accordance with an embodiment of the roller crusher, the first portion of the lever arm is pivotally connected to a lower part of the frame and the second portion of the lever arm is pivotally connected to the lever.

In accordance with an embodiment of the roller crusher, the lever arm is arranged substantially vertically.

In accordance with an embodiment of the roller crusher, the thrust rods and the lever are arranged substantially perpendicularly to the lever arm.

In accordance with an embodiment of the roller crusher, the lever arm is arranged on an outside of the frame.

In accordance with an embodiment of the roller crusher, the lever arm is arranged on an inside of the frame.

In accordance with an embodiment of the roller crusher, at least two lever arms are arranged for each side of the roller crusher.

In accordance with an embodiment of the roller crusher, for each side of the roller crusher, one lever arm is arranged on an outside of the frame and one lever arm is arranged on an inside of the frame.

In accordance with an embodiment of the roller crusher, the deflection distributing shaft is arranged on top of the frame.

In accordance with an embodiment of the roller crusher, a control system is mounted, wherein said control system is configured to monitor a skew of the first and second crusher rolls and wherein the control system further being configured to reduce pressure in said hydraulic system on the first or second side in response to a determination that the skew exceeds a predefined threshold value. As indicated above in relation to the deflection distributor refitting kit, this has several advantages, which apply correspondingly with respect to the roller crusher as well. Among others the dimensions of the deflection distributor refitting kit can be kept down without sacrificing anti-skewing properties.

According to a fourth aspect of the invention, there is provided another roller crusher. The roller crusher comprises a frame; first and second crusher rolls arranged axially in parallel with each other, said first crusher roll being supported in bearings which are configured to be movable relative to the frame, said second crusher roll being supported in bearings which also are configured to be movable; and a hydraulic system configured to adjust the positions of the crusher rolls and the crushing pressure between the two crusher rolls. According to this aspect of the invention the roller crusher further comprises at least one deflection distributor, wherein said at least one deflection distributor comprises a deflection distributing shaft, mounts attaching said deflection distributing shaft at said frame of said roller crusher and thrust rods each having first and second ends, wherein a first end of each of said thrust rods is attached to said deflection distributing shaft via a lever and wherein a second end of each of said thrust rods is attached to a movable bearing housing of said crusher rolls.

Similarly, and correspondingly to the refitting kit, the roller crusher of this fourth aspect will provide substantial advantages over prior art solutions.

In accordance with an embodiment of the roller crusher according to this fourth aspect, the at least one deflection distributor is connected to the second crusher roll in a manner parallel with the hydraulic system.

In accordance with an embodiment of the roller crusher of this fourth aspect, the movable bearing housings are arranged to be slidable movable in the frame.

In accordance with an embodiment of the roller crusher of this fourth aspect, the movable bearing housings are arranged to be pivotably movable relative to the frame.

In accordance with an embodiment of the roller crusher of this fourth aspect, the mounts for the deflection distributing shaft is attached to the frame of the roller crusher.

In accordance with other embodiments of the roller crusher of this fourth aspect, the at least one deflection distributor may have the same features as the deflection distributor of the above-disclosed deflection distributor refitting kit.

In accordance with an embodiment of the roller crusher of this fourth aspect, the hydraulic system of the roller crusher comprises two hydraulic cylinders for each movable bearing on the respective sides of the second crusher roll, wherein each of the thrust rods is arranged between the two hydraulic cylinders on the respective side of the second crusher roll.

In accordance with an embodiment of the roller crusher of this fourth aspect, each of the thrust rods is arranged between the two hydraulic cylinders on the respective side of the second crusher roll, preferably midway between the two hydraulic cylinders on the respective side of the second crusher roll.

In accordance with an embodiment of the roller crusher of this fourth aspect, each of the levers is attached to a first end of a respective thrust rod such that a longitudinal axis of the lever is arranged substantially perpendicular to a longitudinal axis of the thrust rod.

In accordance with an embodiment of the roller crusher of this fourth aspect, said longitudinal axis of the lever passes through the central axis of the deflection distributing shaft and a pivotal point of the lever and the thrust rod.

In accordance with an embodiment of the roller crusher of this fourth aspect, one roll of the first and second crusher rolls has a flange attached to each end thereof, and which flange extends in a radial direction of the roll and has a height above an outer surface of the roll.

In accordance with an embodiment of the roller crusher of this fourth aspect, the flange comprises a feeding structure on the inside of the flange.

In accordance with an embodiment of the roller crusher of this fourth aspect, one deflection distributor is arranged at each crusher roll.

In accordance with an embodiment of the roller crusher of this fourth aspect, a control system is mounted, wherein said control system is configured to monitor a skew of the first and second crusher rolls and wherein the control system further being configured to reduce pressure in said hydraulic system on the first or second side in response to a determination that the skew exceeds a predefined threshold value.

According to a fifth aspect of the invention, there is provided a deflection distributor refitting kit for a roller crusher having a stationary roll and a movable roll that create a crushing gap therebetween, the movable roll having first and second ends. According to this aspect the deflection distributor refitting kit comprises first and second thrust rods each having a first end and a second end, wherein the second end of each of the thrust rods is coupled to one of the first or second ends of the movable roll for movement with the movable roll; first and second levers each connected to the first end of one of the first and second thrust rods; and a rotatable deflection distributing shaft connected between the first and second levers, wherein movement of the either of the first or second levers rotates the deflection distributing shaft and the other of the first or second levers.

In accordance with other embodiments of the deflection distributor refitting kit of this fifth aspect, the deflection distributor may have the same features as disclosed for the deflection distributor of the first aspect of the present invention.

Similarly, and correspondingly to the refitting kit disclosed above, this refitting kit of this fifth aspect will provide substantial advantages over prior art solutions.

According to a sixth aspect of the invention, there is provided a method for controlling a roller crusher. The roller crusher comprises a frame and first and second crusher rolls which are arranged axially in parallel with each other. The first crusher roll is supported in bearing housings which are arranged in the frame and the second crusher roll is supported in bearing housings which are configured to be movable. The roller crusher further comprises an active hydraulic system which is configured to adjust the position of the second crusher roll and the crushing pressure between the two crusher rolls. The roller crusher also comprises a control system, the control system being configured to monitor a skew between the first and second crusher rolls and wherein the control system is further configured to reduce pressure in the hydraulic system on the first or second side in response to a determination that the skew exceeds a predefined threshold value. The method comprising the steps of

- defining one or more threshold values for the skew between the crusher rolls;
- monitoring the skew;
- reducing a pressure in the hydraulic system on the first or the second side in response to a skew exceeding one or more of the defined threshold values.

Similarly, and correspondingly to the refitting kit and other aspects of the present invention, the method of the present invention will provide substantial advantages over prior art solutions.

Other objectives, features and advantages of the present invention will appear from the following detailed disclosure, from the attached claims, as well as from the drawings. It is noted that the invention relates to all possible combinations of features. Especially, it is to be noted that all embodiments of any aspect of the invention can be applied correspondingly to all other aspects.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The invention will be described in more detail and with reference to the appended drawings in which.

DETAILED DESCRIPTION

Figure 1:
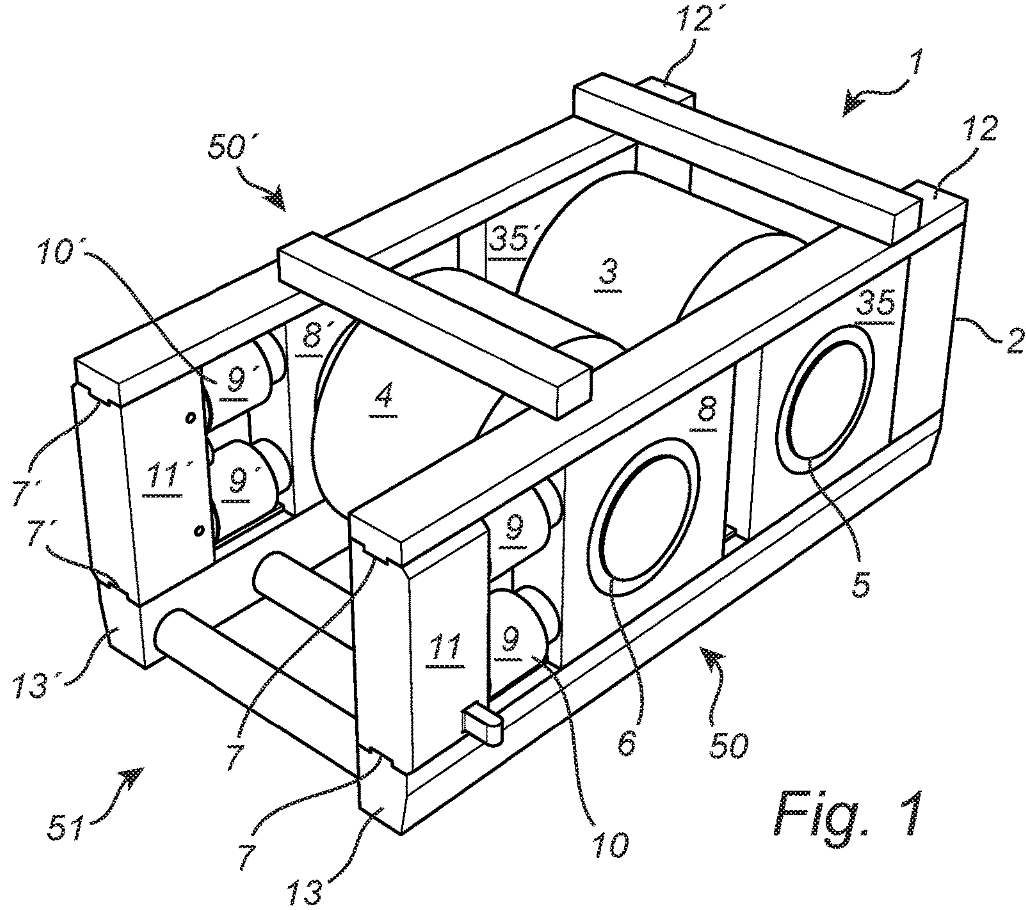
FIG. 1 shows a perspective view of a roller crusher according to prior art.

The present invention will now be described more fully hereinafter with reference to the accompanying drawings, in which exemplifying embodiments of the invention are shown. The present invention may, however, be embodied in many different forms and should not be construed as limited to the embodiments set forth herein; rather, these embodiments are provided for thoroughness and completeness, and to fully convey the scope of the invention to the skilled addressee. Like reference characters refer to like elements throughout.

FIG. 1 shows a roller crusher 1 according to the prior art. Such roller crusher 1 comprises a frame 2 in which a first, fixed crusher roll 3 is arranged in bearings 5, 5'. The bearing housings 35, 35' of these bearings 5, 5' are fixedly attached to the frame 2 and are thus immoveable. A second crusher roll 4 is arranged in the frame 2 in bearings 6, 6' which are arranged in the frame 2 in a slidable moveable manner. The bearings 6, 6' can move in the frame 2 in a direction perpendicular to a longitudinal direction of the first and second crusher rolls 3, 4. Typically a guiding structure 7, 7' is arranged in the frame on first and second sides 50, 50' along upper and lower longitudinal frame elements 12, 12', 13, 13' of the roller crusher 1. The bearings 6, 6' are arranged in moveable bearing housings 8, 8' which can slide along the guiding structure 7, 7'. Further, a number of hydraulic cylinders 9, 9' are arranged between the moveable bearing housing 8, 8' and first and second end supports 11, 11' which are arranged near or at a first end 51 of the roller crusher 1. These end supports 11, 11' attach the upper and lower longitudinal frame elements 12, 12', 13, 13' and also act as support for the forces occurring at the hydraulic cylinders 9, 9' as they are adjusting the gap width and reacting to forces occurring at the crusher rolls due to material fed to the roller crusher 1. Such roller crushers work according to the earlier disclosed crushing technique called interparticle crushing, and the gap between the crushing rolls 3, 4 is adjusted by the interaction of feed load and the hydraulic system effecting the position of the second crusher roll 4. As stated above, such a prior art roller crusher suffers from delay in adjusting the position of the second crusher roll 4. In case of uneven load along the length of the crushing gap or in case of tramp material entering into the crushing gap, especially when entering into the gap off-center, the second crushing roll 4 may skew and the hydraulic system 10, 10' is too slow to adjust the position of the movable bearing housings keeping a constant feed pressure, and the movable bearing housings may jam in the guides 7, 7' and, in case of non-crushable material, the surface of the crushing rolls may be damaged by the non-crushable material, and the whole frame 2 of the roller crusher 1 may become oblique.

Figure 2A:
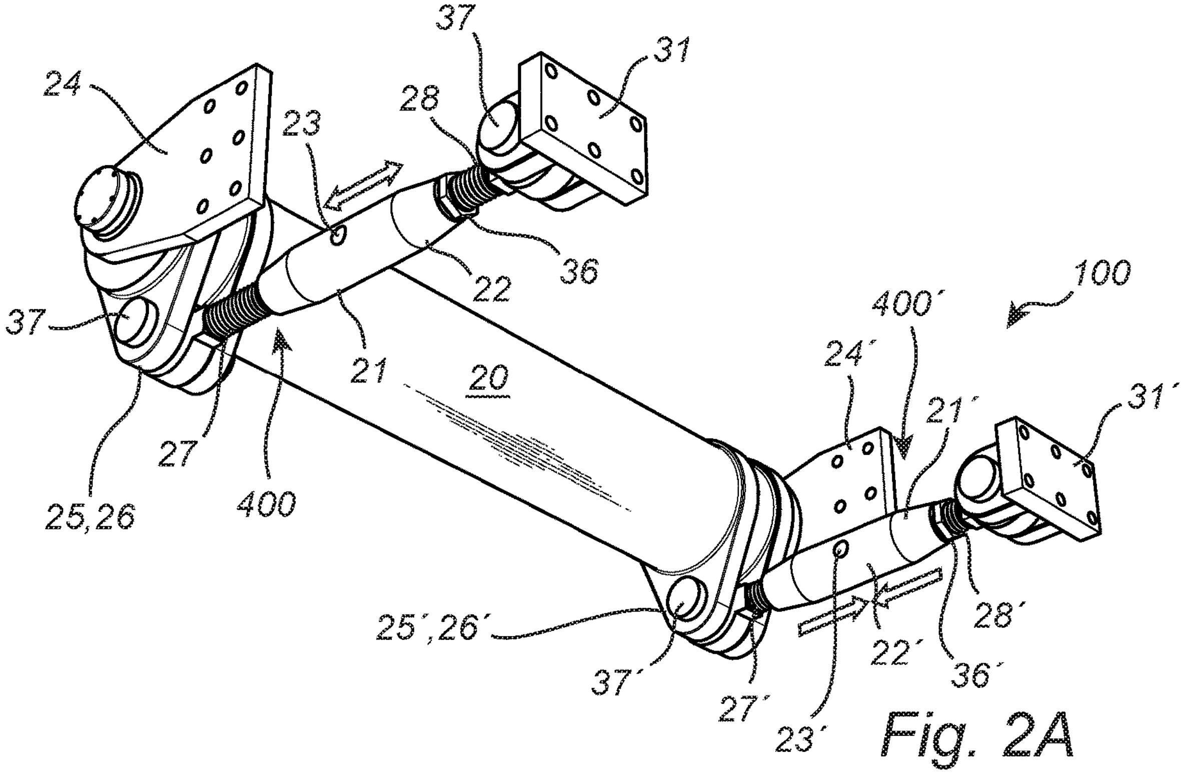
FIG. 2A shows a perspective view of a deflection distributor refitting kit according to one embodiment of the first aspect of the disclosed invention.

FIG. 2A shows a deflection distributor refitting kit 100 according to the present invention. Firstly, the components of the deflection distributor refitting kit 100 will be described and thereafter, the advantages of the deflection distributor refitting kit 100 will be described in detail. The deflection distributor refitting kit 100 comprises a deflection distributing shaft 20 and levers 25, 25' attached at respective ends of the deflection distributing shaft 20. Further, arranged at each end of the deflection distributing shaft 20 is a mount 24, 24' which is used to mount the deflection distributing shaft 20 of the deflection distributor refitting kit 100 to a frame 2 of a roller crusher 1. The deflection distributing shaft comprises rotational bearings, preferably spherical bearings, in each end thereof allowing the deflection distributing shaft 20 to rotate in relation to the mounts. The levers 25, 25' each comprise a shank 26, 26' which are attached with a first end thereof to the deflection distributing shaft 20 and which extends in a radial or tangential direction of the deflection distributing shaft 20. Attached to a second end of each of the levers 26, 26' is a first end 27, 27' of a thrust rod 21, 21'. Second ends 28, 28' of the thrust rods are intended to be attached to the moveable bearing housings 8, 8' of the roller crusher 1. Each of the levers 25, 25' is attached to a first end 27, 27' of a respective thrust rod 21, 21' such that a longitudinal axis of the lever 25, 25' is arranged substantially perpendicular to a longitudinal axis of the thrust rod 21, 21'. Further, the longitudinal axis of the lever 25, 25' passes through the central axis of the deflection distributing shaft 20 and a pivotal point of the lever 25, 25' and the thrust rod 21, 21'. The thrust rods 21, 21' are provided with preload arrangement 400, 400' comprising means for adjusting the length of the thrust rods 21, 21'. In the embodiment disclosed in FIG. 2A, this length adjustment is provided in the form of a threaded solution similar to how a turnbuckle, or stretching screw, functions. The first end 27, 27' and the second end 28, 28' are both threaded and connected by means of a threaded center part 22, 22'. The two ends of the center part 22, 22' comprises one left hand thread and one right hand thread such that when the center part 22, 22' is rotated, both the first end 27, 27' and the second end 28, 28' will be retracted or both will be extracted. This means that the overall length of the thrust rods 21, 21' can be adjusted. This, in turn, means that by shortening one of the thrust rods 21, 21' and lengthening the other, a bias can be introduced into the mechanical connection between the bearing housings 8, 8' such that joints of the mechanical connection are biased in one direction. For example, a pin 37, 37' inserted into a bearing will be biased towards an inner surface of the bearing. When vibrations occur, the pin 37, 37' is already abutting a surface of the bearing and shock loads can be eliminated or at least reduced. It is acknowledged that this bias, which is done in a direction parallel with the longitudinal direction of the thrust rods 21, 21', will be more effective in reducing the detrimental effects of loads from vibrations in one direction only and less so with respect to vibrations in other directions. For example, a thrust rod 21, 21' which has been extended such that it is put under compressional load, will be less prone to damage from vibrational forces acting to further compress the thrust rod 21, 21'. This since any clearance between the parts of the joints, e.g. a pin 37, 37' and inner surface of a bearing of a pivot bracket 31, 31', will already be removed such that the parts abut each other when the force from the vibration acts upon the joint, thus avoiding a shock load. Thereby the effect of at least 50% of the vibration events can be reduced, assuming that the forces are evenly distributed between events causing compression of the thrust rods 21, 21' and tensioning of the thrust rods 21, 21'. The length adjustment may in the embodiment shown in FIG. 2A be accomplished by rotating of the center part 22, 22' using a tool that can be applied to opening 23, 23'. This is an example only and the skilled person realizes that this rotation can be performed in many other ways. Locking elements 36, 36' are also indicated in FIG. 2A for maintaining a preferred length of the thrust rods 21, 21'. These locking elements 36, 36' should be applied to both first ends 27, 27' and second ends 28, 28'.

Figure 2B:
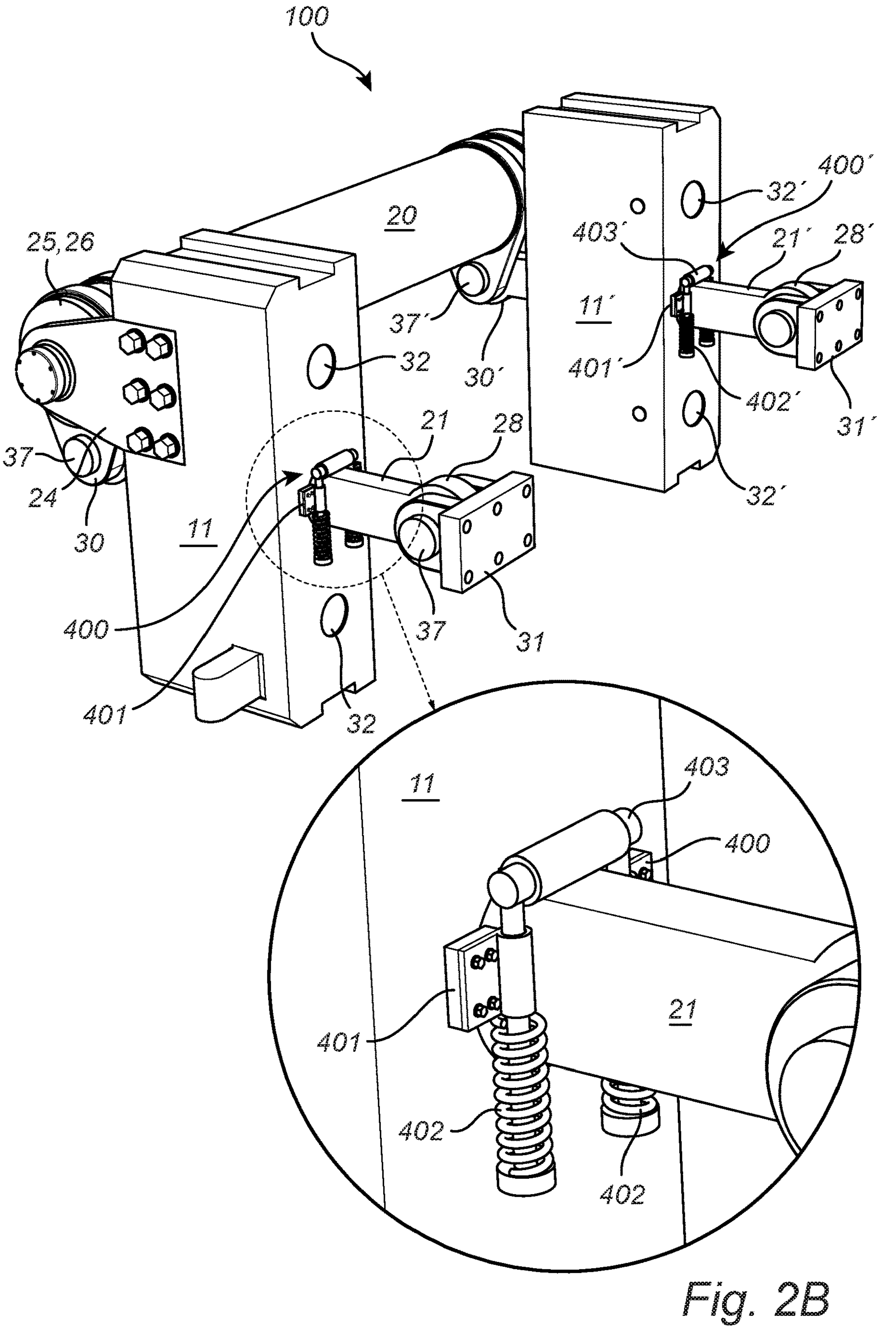
FIG. 2B shows a perspective view of a detail of the deflection distributor refitting kit according to one embodiment of the first aspect of the disclosed invention.
Figure 2C:
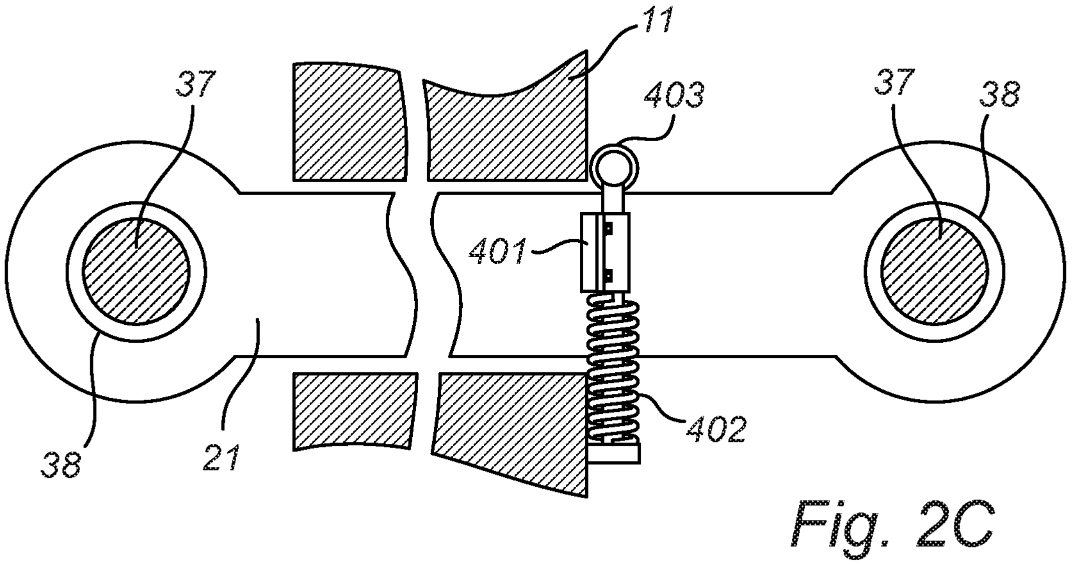
FIGS. 2C-2E show schematic side views of the embodiment of the first aspect of the disclosed invention as shown in FIG. 2B.
Figure 2D:
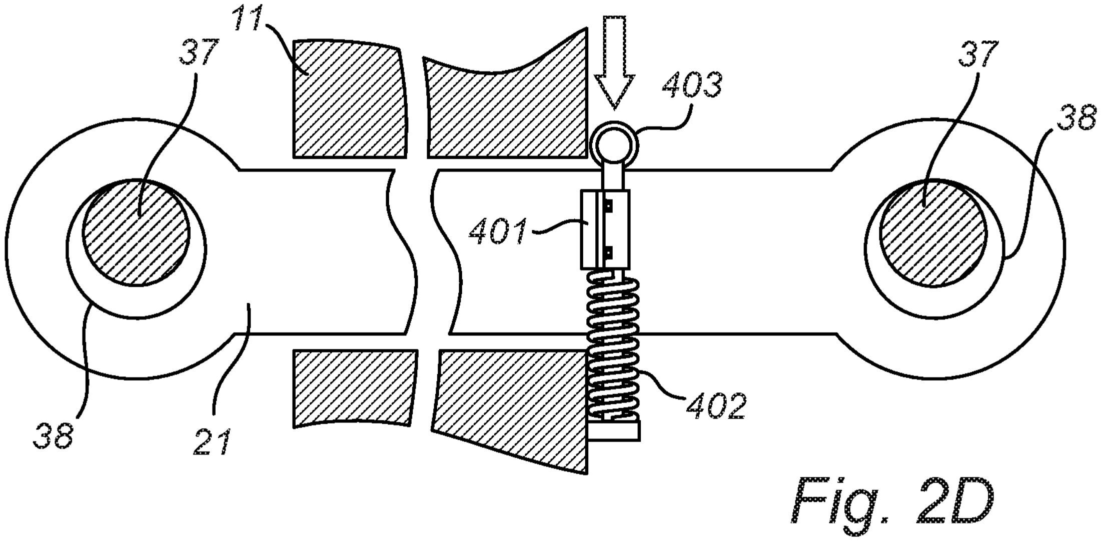
Figure 2E:
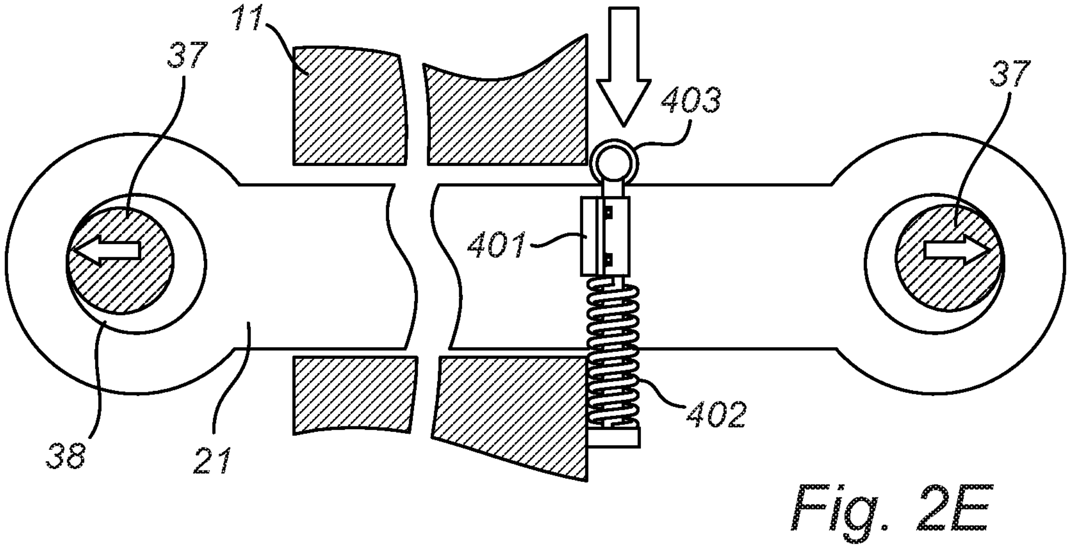
Figure 2F:
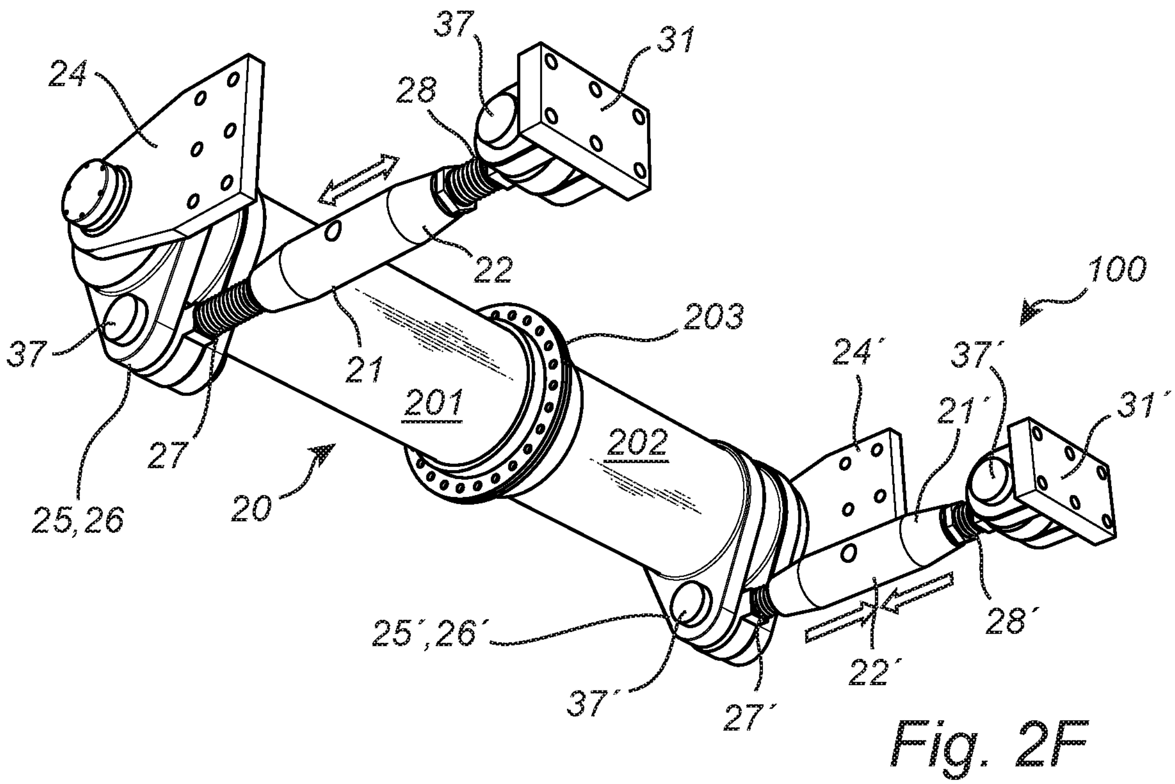
FIG. 2F shows a perspective view of a deflection distributor refitting kit according to another embodiment.

FIG. 2B shows a perspective view of an alternative preload arrangement 400, 400' 400, 400' for biasing the thrust rods 21, 21' in a direction generally perpendicular to the longitudinal direction of the thrust rods 21, 21'. The preload arrangement 400, 400' comprises fastening means 401, 401', springs 402, 402' and a biasing member 403, 403'. The springs 402, 402' will in this embodiment force the biasing member 403, 403' downwardly towards an upper surface of a corresponding thrust rod 21, 21'. The effect of this preload can best be seen in FIG. 2C-2E. FIG. 2C discloses a situation where the biasing member 403, 403' is not acting on the thrust rod 21, 21' and no forces are acting on the thrust rod 21, 21'. As can be seen, there is a symmetrical clearance between the pin 37 and the diameter of the inner surface 38 of the bearing provided at each end of the thrust rod 21, 21'. If a load, in any direction, would be applied to the thrust rod 21, 21', the pin 37 and the inner surface 38 of the bearing would accelerate unhindered relative to each other and a shock load will occur as the pin 37 hits the inner surface 38 of the bearing. In FIG. 2D, a vertical bias is applied to the preload arrangement 400, 400' forcing the biasing member 403 down against the upper surface of the thrust rod 21, 21'. This will have the effect that the pin 37 will always abut the inner surface 38 of the bearing such that when a load, in most directions, would be applied to the thrust rod 21, 21', the pin 37 would not accelerate unhindered towards the inner surface. If, for example, a horizontal tensional force would be applied, as in FIG. 2E, the pin 37 would slide along the inner surface 38 from a twelve o'clock position within the bearing towards a three o'clock (right-hand pin 37) or a nine o'clock (left-hand pin 37) and the shock load can be avoided or at least reduced. This will greatly increase the lifetime of the parts involved, thereby reducing costs and down-time due to maintenance. It should be noticed that the biasing force can be applied in other directions instead of downwardly, for example upwardly. FIG. 2F shows an alternative deflection distributor refitting kit 100 in which the thrust rods 21, 21' are provided with means for adjusting the length thereof. In the embodiment disclosed in FIG. 2C, this length adjustment is provided in the form of a threaded solution similar to how a turnbuckle, or stretching screw, functions. The first end 27, 27' and the second end 28, 28' are both threaded and connected by means of a threaded center part 22, 22'. The two ends of the center part 22, 22' comprises one left hand thread and one right hand thread such that when the center part 22, 22' is rotated, both the first end 27, 27' and the second end 28, 28' will be retracted or both will be extracted. This means that the overall length of the thrust rods 21, 21' can be adjusted. This, in turn, means that by shortening one of the thrust rods 21, 21' and lengthening the other, a bias can be introduced into the mechanical connection between the bearing housings 8, 8' such that joints of the mechanical connection are biased in one direction. For example, a pin 30, 30' inserted into a bearing will be biased towards an inner surface of the bearing. When vibrations occur, the pin 30, 30' is already abutting a surface of the bearing and shock loads can be eliminated or at least reduced. It is acknowledged that this bias, which is done in a direction parallel with the longitudinal direction of the thrust rods 21, 21', will be more effective in reducing the detrimental effects of loads from vibrations in one direction only and less so with respect to vibrations in other directions. For example, a thrust rod 21, 21' which has been extended such that it is put under compressional load, will be less prone to damage from vibrational forces acting to further compress the thrust rod 21, 21'. This since any clearance between the parts of the joints, e.g. a pin 30, 30' and inner surface of a bearing of a pivot bracket 31, 31', will already be removed such that the parts abut each other when the force from the vibration acts upon the joint, thus avoiding a shock load. Thereby the effect of at least 50% of the vibration events can be reduced, assuming that the forces are evenly distributed between events causing compression of the thrust rods 21, 21' and tensioning of the thrust rods 21, 21'. The length adjustment may in the embodiment shown in FIG. 2F be accomplished by rotating of the center part 22, 22' using a tool that can be applied to opening 23, 23'. This is an example only and the skilled person realizes that this rotation can be performed in many other ways. Locking elements 36, 36' are also indicated for maintaining a preferred length of the thrust rods 21, 21'. These locking elements 36, 36' should be applied to both first ends 27, 27' and second ends 28, 28'. Also here, the deflection distributing shaft 20 comprises two interconnectable sub-shafts 201 and 202, interconnected by means of a coupling 203.

Figure 2G:
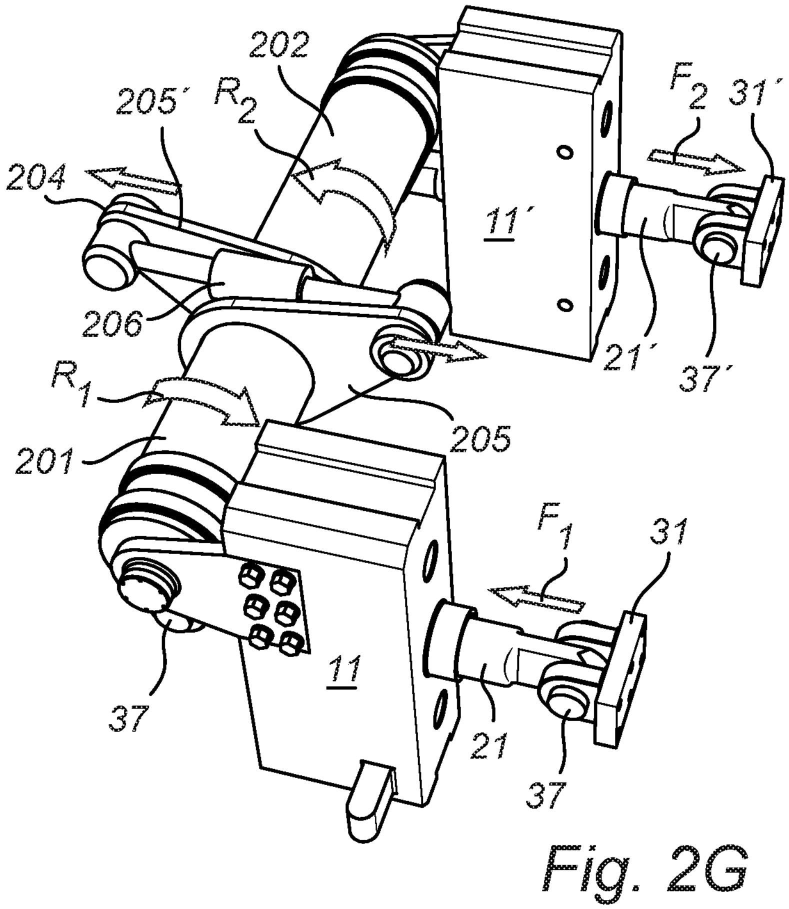
FIG. 2G shows a perspective view of a deflection distributor refitting kit according to another embodiment.

FIG. 2G shows an alternative deflection distributor refitting kit 100 according to the invention. In this embodiment the first and second shaft parts 201, 202 are shown interconnected by means of a shock absorbing unit 204. The shock absorbing unit 204 comprises two shanks 205, 205' each attached to a respective first and second shaft part 201, 202. Attached to one end of each shank 205, 205' is a shock absorber 206. This shock absorber can comprise for example elastic elements which are preset to deform or decompress at a given load such that the deflection distributor refitting kit 100 can perform its functions during normal load conditions, i.e. maintaining the rolls of the roller crusher parallel with each other but as soon as the forces in the mechanical connection between the moveable bearing housings exceed a predefined threshold, the shock absorbing unit 204 will allow a relative rotational movement between the first and second shaft part 201, 202. This will prevent damage to the deflection distributor refitting kit 100 and to the roller crusher to which the deflection distributor refitting kit 100 is mounted. It should be noted that stroke of the shock absorber 206 could be limited to only eliminate the load spikes that may sometimes occur in roller crushers but still maintain the rolls of the roller crusher in a more or less parallel orientation such that any flanges arranged on any the rolls will not come in contact with the outer surface of the other roll, which could potentially damage the flanges. Thus, the shock absorbing unit 204 will certain allow for a limited amount of un-parallelism only. This will still be enough to cut out the load spikes that may cause structural damage to the deflection distributor refitting kit 100 or the roller crusher. The elastic elements of the shock absorber 206 may be pre-compressed to avoid fatigue over time and to avoid or at least reduce hysteresis. The shock absorber may also comprise a hydraulic component using a damping medium and valves, possibly adjustable, that will have desired shock absorbing function. FIG. 2G exemplifies the function of the present invention. A compression force F1 acts on the first thrust rod 21 and a tension force F2 acts on the second thrust rod 21'. If these forces exceed a predefined threshold, where forces above this threshold are deemed to be possibly damaging to the equipment, a small relative rotational movement R1-R2, is allowed between the first and second shaft parts 201, 202. As soon as the above-threshold event has passed, the shock absorbing unit will return to an initial state where the rolls of the roller crusher are again parallel with each other.

Figure 2H:
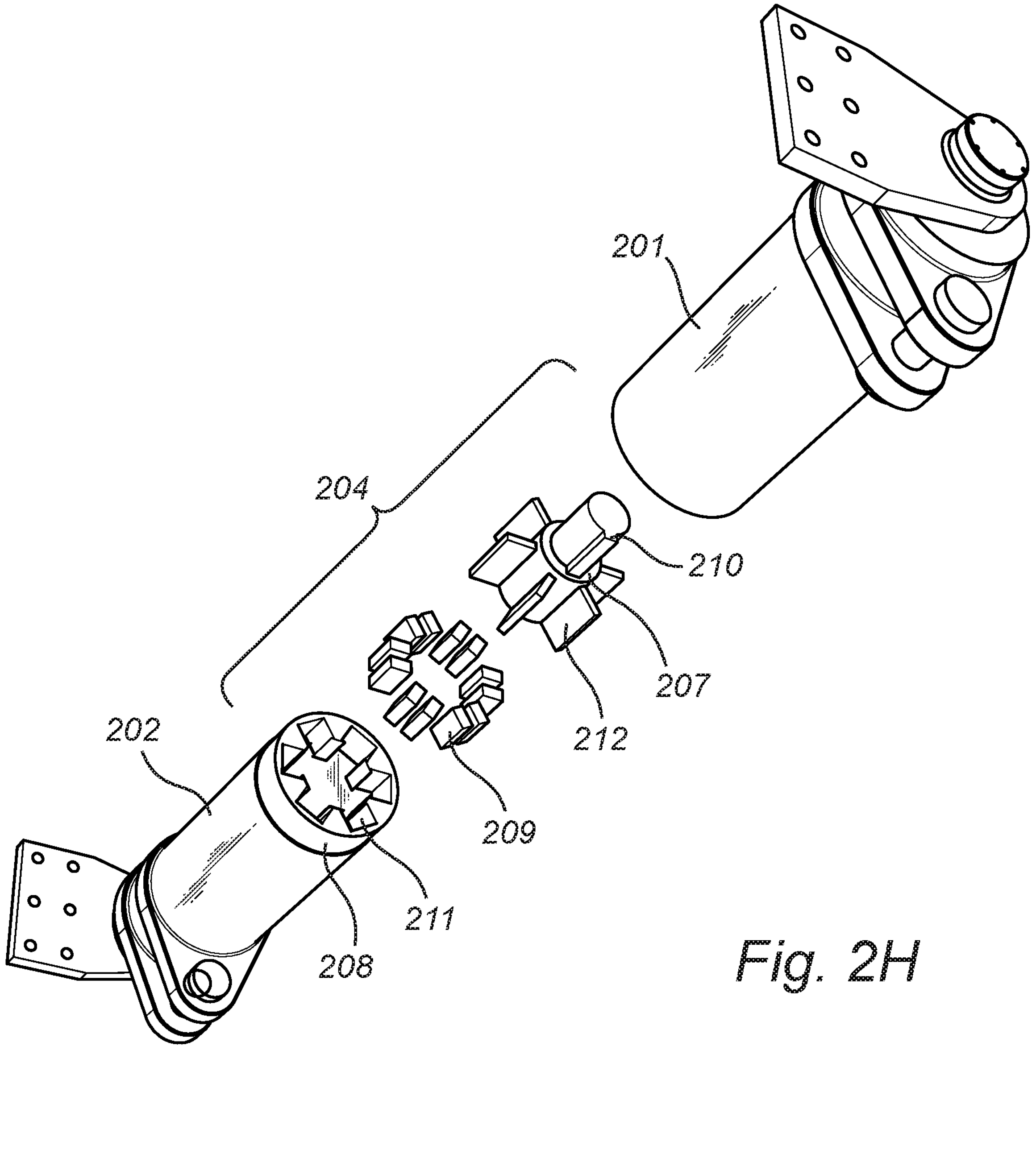
FIG. 2H shows an exploded view of a deflection distributor shaft according to another embodiment.

FIG. 2H shows an exploded view of an embodiment of the first and second shaft parts connected by a shock absorbing unit 204 comprising a torsional joint comprising a first hub 207 attached and rotationally fixed to first shaft part 201 by means of e.g. a splined connection 210, a second hub 208 which is attached and rotationally fixed to the second shaft part 202, and a plurality of elastic elements 209. The second hub 208 comprises pockets 211, each of which can accommodate two elastic elements 209 and one flange element 212 of the first hub 207. When the first and second shaft parts 201, 202 are connected, in this embodiment by inserting the first hub and the elastic elements 209 into second hub 208, the first and second shaft parts 201, 202 will function as a rigid deflection distributing shaft as long as a predetermined force is not achieved. This means that the mechanical connection will distribute the movements of the bearing housings such that the rolls will be maintained in a parallel state. When, however, this threshold is exceeded, the flanges 212 of the first hub 207 will cause a deformation or decompression of the elastic elements 210 between which the flange is sandwiched. Similar to previous embodiments, the elastic elements 210 may be pre-compressed to avoid fatigue over time and to avoid or at least reduce hysteresis. The elastic elements may be incompressible such that the shock absorbing effect is caused by deformation instead of compression. As soon as the above-threshold event has passed, the shock absorbing unit will return to an initial state where the rolls of the roller crusher are again parallel with each other. The embodiment of FIG. 2D has an advantage in that the outer dimensions of the shock absorbing unit are the same, or substantially the same as the deflection distributing shaft as such, allowing for mounting also in situations with restricted room for additional equipment.

The deflection distributor refitting kit 100 according to the present invention is arrangeable at previously known roller crushers 1 as shown in FIG. 1. By using the deflection distributor refitting kit 100, problems in previously known roller crushers 1, more specifically skewing problems occurring in roller crusher 1 can be avoided. The gap width between the crusher rolls 3, 4 will vary during use depending on the characteristics and amount of material fed to the roller crusher, and the gap width may also vary along the length of the crusher rolls 3, 4 depending on how the material is fed to the roller crusher 1 and on the characteristics thereof. For example, if more material is located towards a first side 50 of the roller crusher 1, there is a risk that the gap will become wider towards the first end 50 than towards a second side 50' of the roller crusher 1. The moveable second crusher roll 4 will become askew. This has several disadvantages. For example, the skewing creates forces which the roller crusher 1 is not suitable to handle. The frame 2 is mainly intended to handle forces directed in the longitudinal direction of the roller crusher 1. Further, forces in oblique directions may cause jamming in the guiding structure 7, 7' and the moveable bearing housings 8, 8' will get stuck, thus becoming unable to react and move as required by the material feed situation. In order to avoid skewing, it is required that both ends of the second crusher roll 4, 4' travel the same distance in the same amount of time in response to an event involving uneven feed, i.e. feed situations where the load at one end of the second crusher roll 4 is greater than the load at a second end of the second crusher roll 4. The hydraulic system 10, 10' comprising hydraulic cylinders 9, 9' is not able to respond adequately fast to these skewing situations. This type of situations would require that large amounts of hydraulic liquid is displaced within fractions of a second. And not only need a hydraulic system to displace this amount of hydraulic liquid in such short time, it must first also measure the correct amount of liquid to displace. The deflection distributor of the present invention on the other hand, has no problems with this. It is able to immediately transfer an unbalanced load event from one moveable bearing housing 8, 8' located on one side of the roller crusher 1 to the moveable bearing housing 8, 8' on the other side of the roller crusher 1. In response to a displacement of one of the moveable bearing housings 8, 8', the corresponding thrust rod 21, 21' attached to that moveable bearing housing 8, 8' will force the corresponding lever 25, 25' to move, which in turn will cause the deflection distributing shaft 20 to rotate in the rotating bearings in the mounts 24, 24', thereby causing a corresponding movement of the other lever 25, 25', the other thrust rod 21, 21' and finally the other moveable bearing housing 8, 8'. This can also be seen in the schematic top view of FIG. 5. Here, a situation is described where an uneven feed event between the crusher rolls 3, 4 off-center, more towards the first side 50 of the roller crusher. This will cause the first thrust rod 21 to move towards the first end 51 of the roller crusher 1 and it in turn will cause first lever 25 also to move towards the first end 51 and by its coupling to the deflection distributing shaft 20, the deflection distributing shaft 20 will be forced to rotate in the rotational bearings in the mounts 24, 24'. This rotation will cause a movement of the second lever 25' to move similar to the first lever 25 and the movement of the second lever 25' will force the second thrust rod 21' to perform a movement which is identical to that of the first thrust rod 21 thereby facilitating the parallel movement of the two moveable bearing housings 8, 8' such that the second, moveable crusher roll 4 is kept parallel with the first, fixed, crusher roll 3 at all times.

Figure 5:
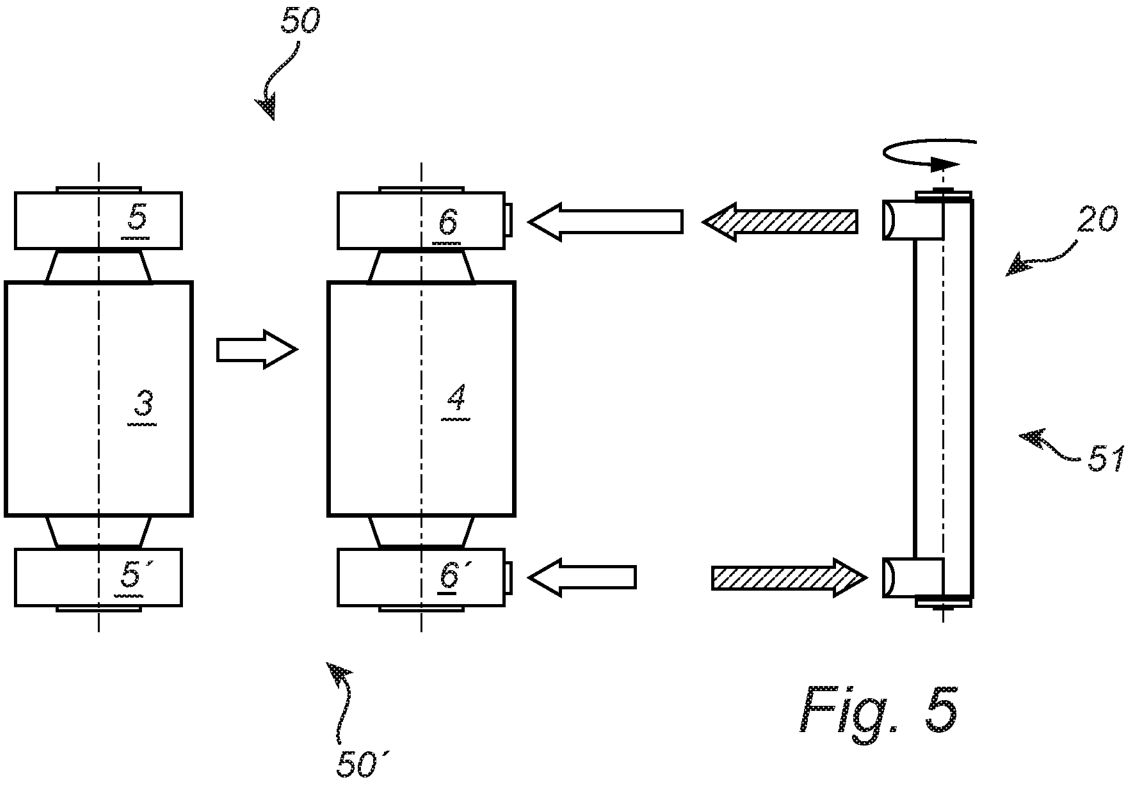
FIG. 5 shows a schematic view of deflection distribution changes during uneven feed characteristics along the length of the crushing gap within the roller crusher with a deflection distributor according to one embodiment of the first aspect of the disclosed invention.

As can be seen in FIG. 5, the resulting forces acting on the bearings of the bearing housings 8, 8' are directed in the same direction, but the force acting on the first bearing housing 8 will be greater. It is this difference in resulting loads that would otherwise cause skewing of the second crusher roll 4 and jam the moveable bearing housings 8, 8' in the guiding structure and also cause excessive wear of the roller crusher 1 as a whole. The deflection distributor 100 according to the disclosed invention will act on the excessive load in one end and automatically deflect the same distance in the second end and thereby maintain parallelism, and will also provide for a parallel return, as well as provide for a constant feed pressure profile within the roller crusher 1.

Figure 3:
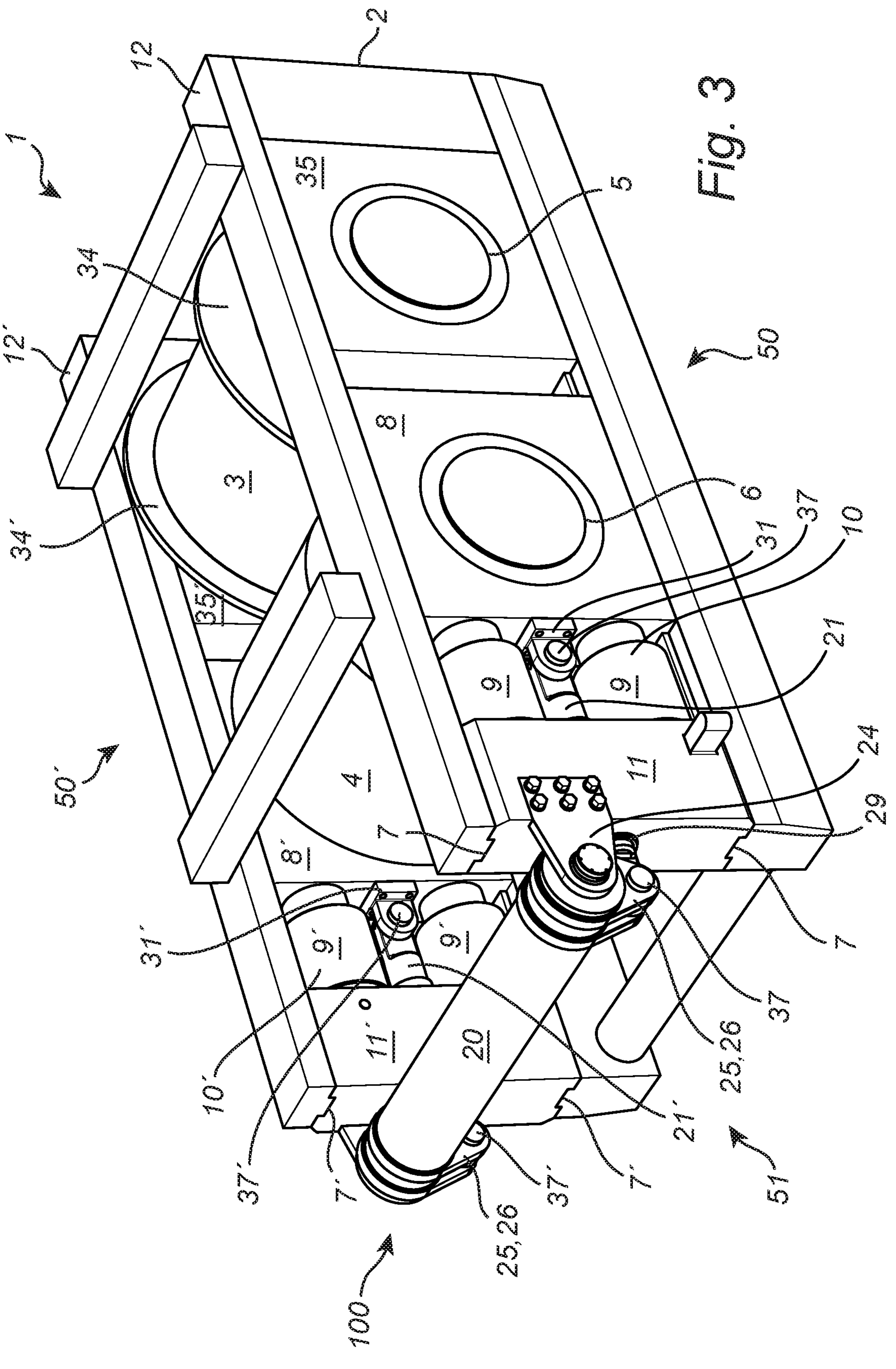
FIG. 3 shows a perspective view of a roller crusher with a deflection distributor according to an embodiment of the third aspect of the disclosed invention.
Figure 8:
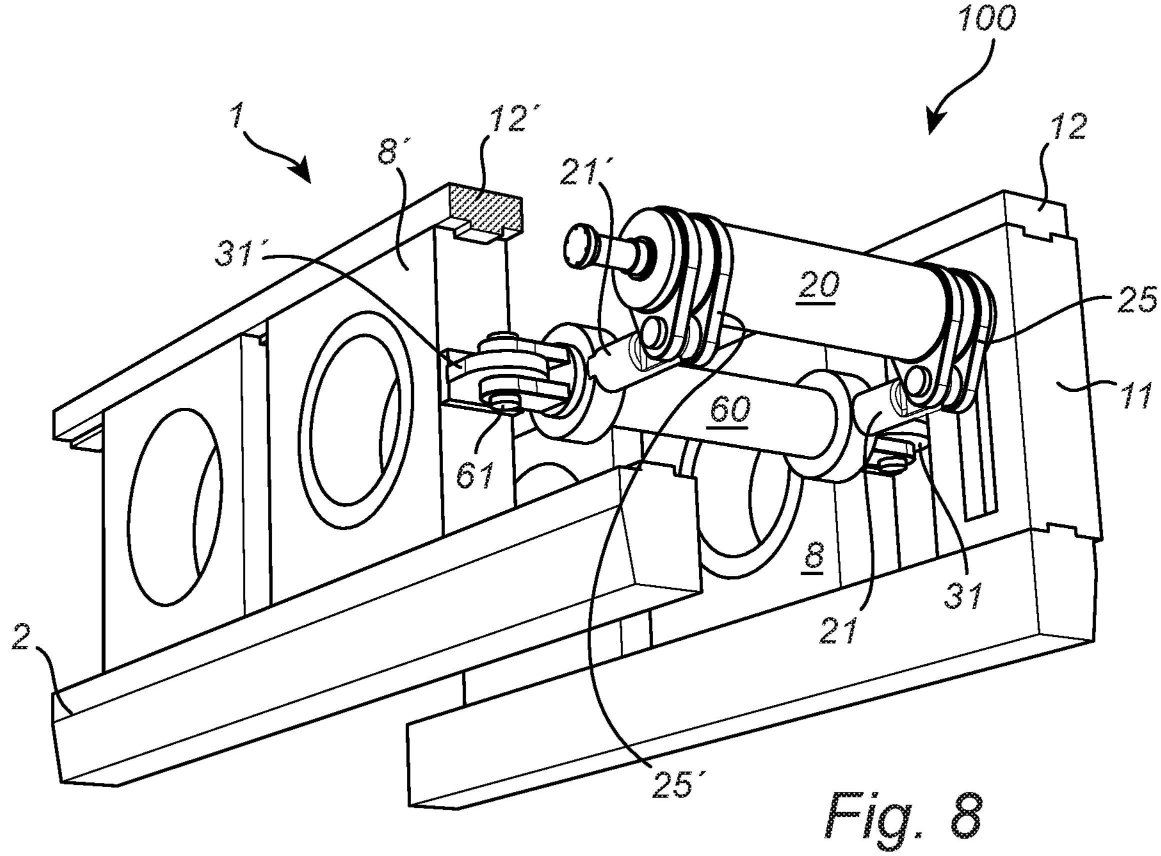
FIG. 8 shows a roller crusher with a deflection distributor refitting kit according to a further embodiment of the first aspect of the disclosed invention.
Figure 9:
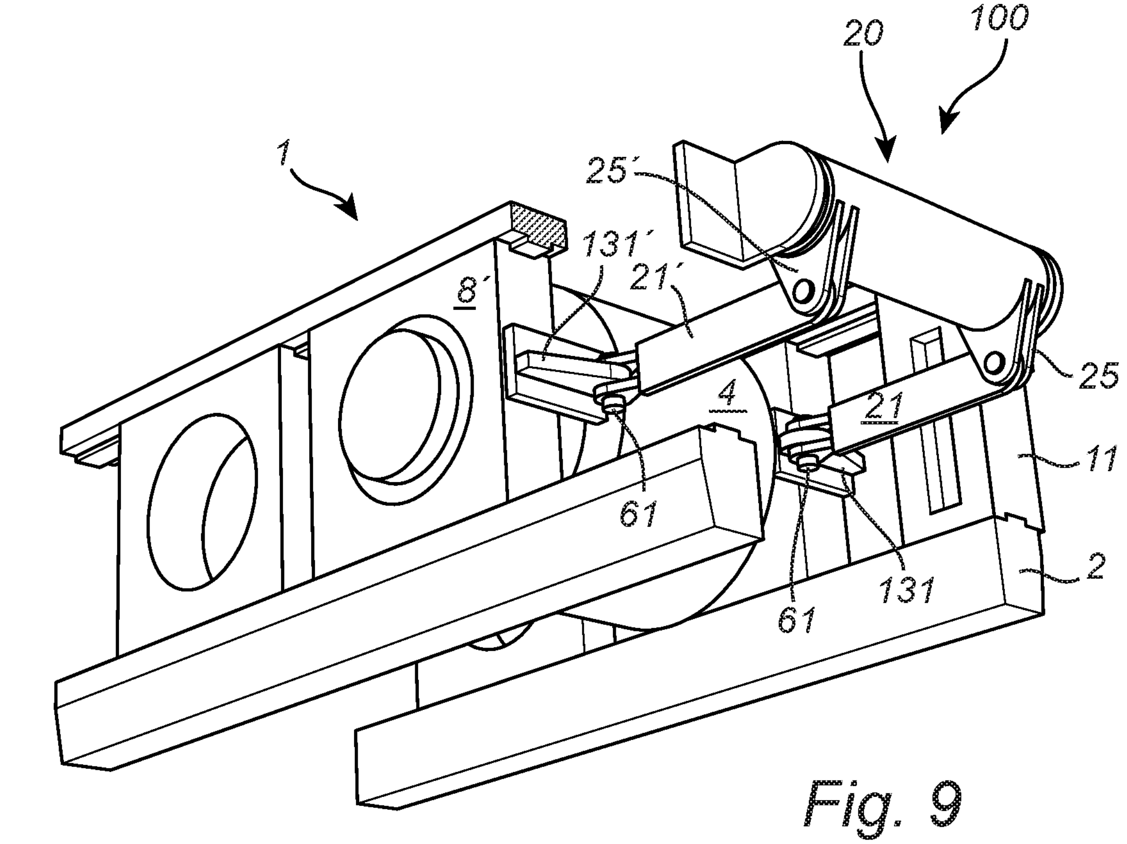
FIG. 9 shows a roller crusher with a deflection distributor refitting kit according to a further embodiment of the first aspect of the disclosed invention.

In FIG. 3, a roller crusher 1 with a deflection distributor refitting kit 100 according to one embodiment of the present invention can be seen, and in FIG. 8 and FIG. 9, a roller crusher 1 with a deflection distributor refitting kit 100 according to another embodiment of the present invention can be seen. The mounts 24, 24' for the deflection distributing shaft 20 are attached to the end supports 11, 11' of the frame 2 and the thrust rods 21, 21' pass through channels 29, 29' in the end supports 11, 11'. It can readily be understood that other solutions than channels are conceivable, for example recesses or similar in the outer or inner side walls of the end supports 11, 11'. In the embodiments shown in FIG. 3 and FIG. 18, the hydraulic system 10 comprises four hydraulic cylinders 9, 9', two on each side 50, 50' of the roller crusher 1, and each of the thrust rods 21, 21' extends in between the two hydraulic cylinders 9, 9' respectively. This is advantageous in that it can help achieve a balanced load situation. The mounts 24, 24' are bolted to the respective end supports 11, 11' but other fastening options are conceivable to the person skilled in the art, e.g. welding. The thrust rods 21, 21' are in these embodiments attached to the moveable bearing housings 8, 8' by means of first pivot bracket 31, 31' and to the levers 25, 25' by means of second pivot brackets 30, 30'. Advantages of these pivot brackets will be discussed in detail in relation with FIG. 6. Other fastening means are also conceivable, for example the trust rods 21, 21' may be fixedly attached by bolting onto the movable bearing housings 8, 8', and may be attached to the levers 25, 25' with semi-spherical slide bearings.

Figure 17:
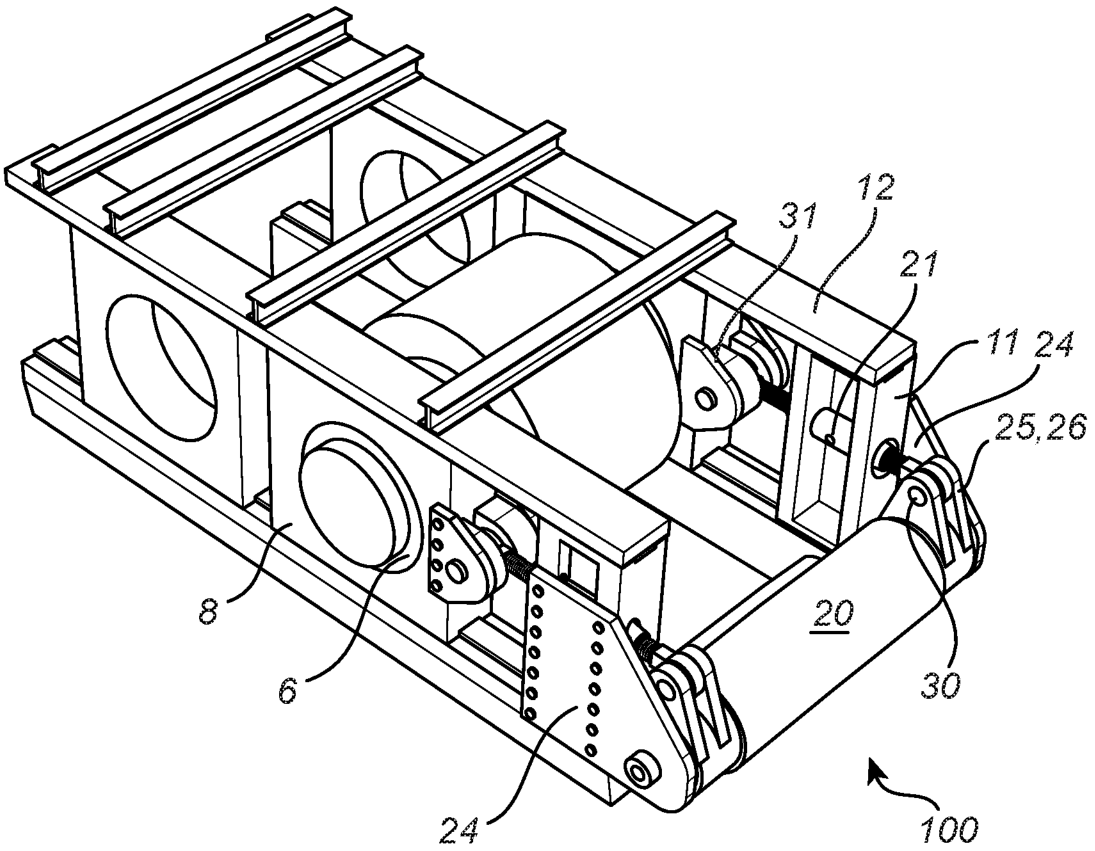
FIG. 17 shows a perspective view of a roller crusher with a deflection distributor refitting kit according to a further embodiment of the first aspect of the disclosed invention.

The embodiment shown in FIG. 17, may also comprise four hydraulic cylinders, two on each side of the roller crusher 1, and each of the thrust rods 21, extends in between the two hydraulic cylinders 9, respectively. The hydraulic cylinders 9 are shown in position for the embodiment in FIG. 18.

Figure 4:
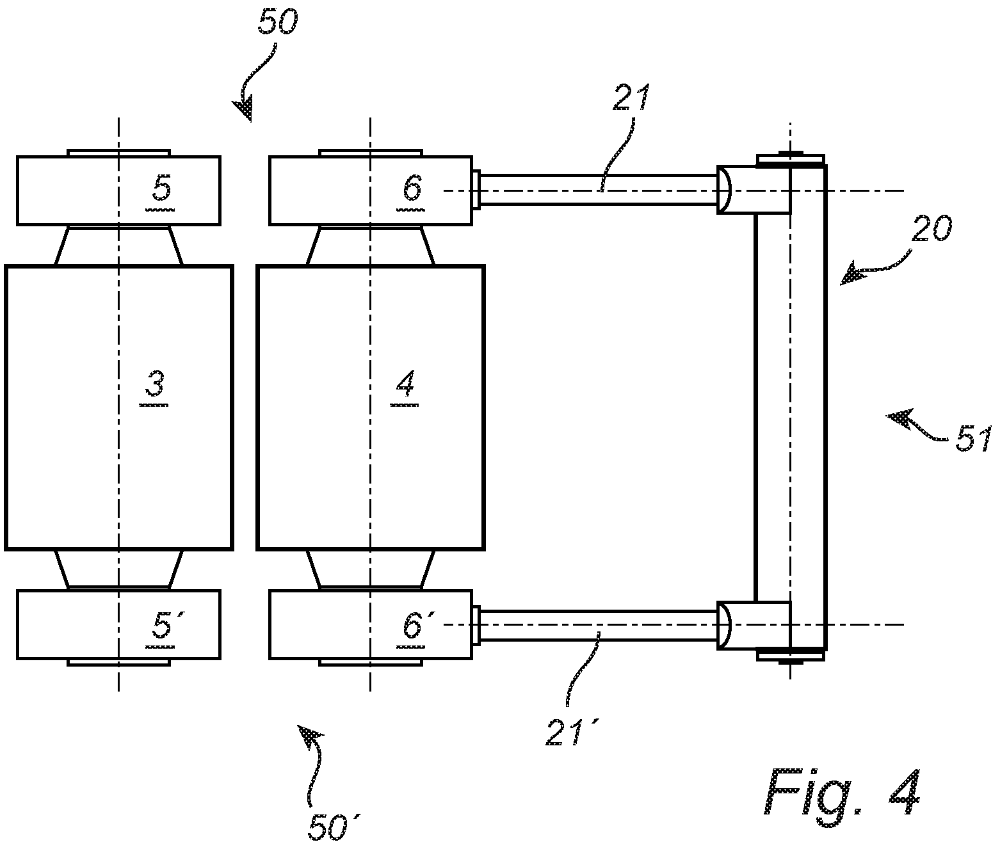
FIG. 4 shows a schematic bottom view of an arrangement with the deflection distributor and the first and second crusher rolls.

FIG. 4 shows a schematic bottom view of a deflection distributor according one embodiment of the disclosed invention arranged and coupled with the movable bearings housings 8, 8' of the second crusher roll 4 and the first crusher roll 3 is arranged in parallel therewith. With the deflection distributor according to the disclosed invention a mechanical connection between the bearing housings 8, 8' arranged at the respective two ends of the second crusher roll 4 is created. Thus, any uneven material feed (tramp or feeding characteristics) which is unevenly distributed within the length of the crushing gap) acting on the second crusher roll 4 will, with the overload distributor according to the disclosed invention, result in a parallel movement of both bearing housings 8, 8', independently of the position of this material uneven feed of material along the length of the crushing gap.

Figure 6:
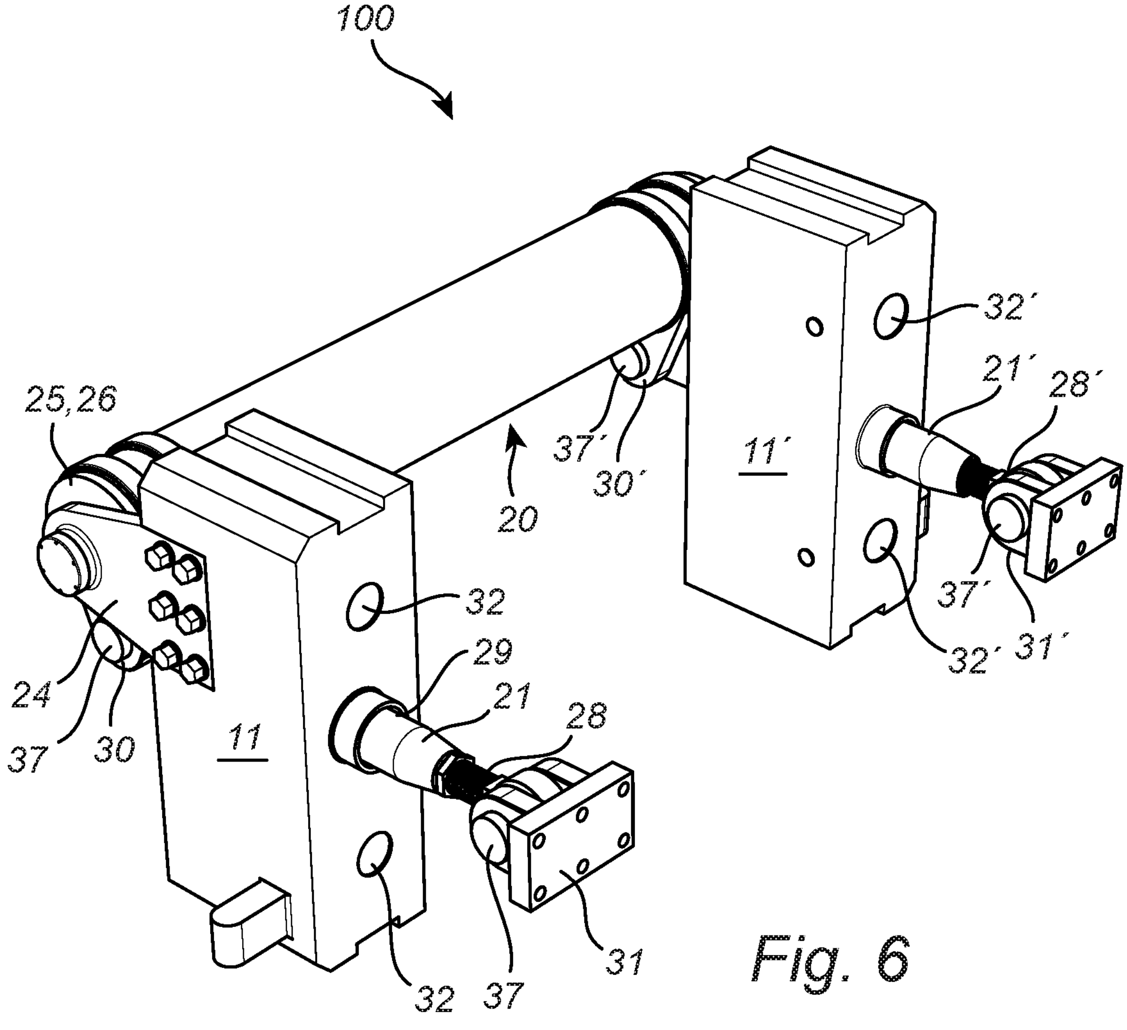
FIG. 6 shows a deflection distributor refitting kit according to another embodiment of the first aspect of the disclosed invention.

FIG. 6 shows a deflection distributor refitting kit 100 according to another embodiment of the disclosed invention. The deflection distributor refitting kit 100 comprises the deflection distributor shaft 20 with shanks 25, 25', and trust rods 21, 21', and further comprises end supports 11, 11' onto which the deflection distributor shaft 20 is mounted with the mounts 24, 24'. The trust rods 21, 21' are arranged in channels 29, 29' which are provided in each end support 11, 11' to allow a substantially linear movement of the thrust rods 21, 21' through the channels 29, 29'. The thrust rods 21, 21' are arranged with pivot brackets 30, 30' in first ends 27, 27' thereof to the shanks 25, 25', and are also arranged with pivot brackets 31, 31' in a second end 28, 28' thereof for future attachment to the movable bearing housings 8, 8' in a roller crusher 1. The pivot joint 30, 30' of the thrust rod 21, 21' and the shank 25, 25' ensures that a linear or mainly linear movement in the thrust rod 21, 21' is transferred to the lever 25, 25' and thus to the deflection distributing shaft 20 without causing unnecessary torsional load in the thrust rod 21, 21' or in the lever 25, 25'. The pivot joint 31, 31' of the thrust rod 21, 21' and the movable bearing housing 8, 8' will ensure that the linear movement of the bearing housing 8, 8' is transferred to the thrust rod without causing unnecessary torsional load in the thrust rod 21, 21' or bearing housing 8, 8'.

The end supports 11, 11' are arranged to be easily mounted to the frame 2 of the roller crusher 1 at a first side 50 and a second side 50' thereof, and may also be arranged to be coupled to at least one hydraulic cylinder 9, 9' of the hydraulic system 10, 10' of the roller crusher 1. In the embodiment shown in FIG. 6, the channels 29, 29' for the thrust rods 21, 21' on each side 50, 50' are arranged between two coupling points 32, 32' for the hydraulic cylinders 9, 9', and in a position to be aligned perpendicular to and in the same horizontal plane as the central axis of the second crusher roll 4 in the roller crusher 1. With this arrangement, the deflection distributor 100 will act in parallel with the hydraulic system 10, 10', as described earlier, and allows for an optimal load distribution when fitted to a roller crusher 1 and the load may be distributed in the same vertical plane and thereby cause less stress and torsional forces in the frame 2 of the roller crusher 1.

Figure 7:
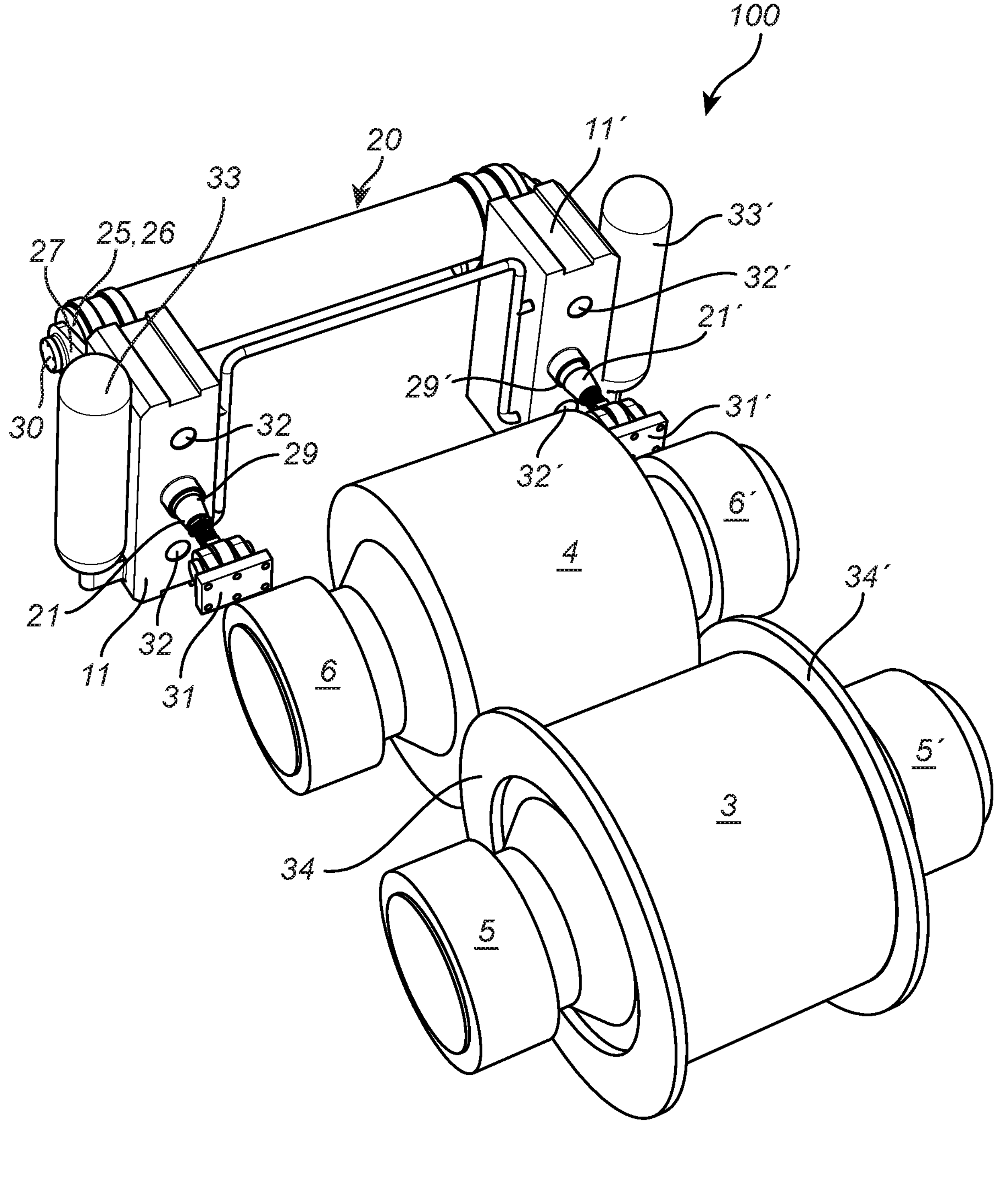
FIG. 7 shows a deflection distributor refitting kit according to a further embodiment of the first aspect of the disclosed invention.

FIG. 7 shows a deflection distributor refitting kit 100 according to another embodiment of the disclosed invention. This deflection distributor refitting kit 100 comprises, in addition to the parts shown in FIG. 6, also accumulators 33, 33' which are arranged to be connected with the hydraulic system 10, 10' on the roller crusher. By providing the accumulators together with the deflection distributor refitting kit 100 the positioning of the accumulators 33, 33' may be optimized not to interfere with mount position for the deflection distributor shaft and the thrust rods, but also to keep the accumulators as close as possible to the hydraulic cylinders 9, 9' in order to minimize pipelines for the transportation of hydraulic fluid back and forth from the accumulators 33, 33' and the hydraulic cylinders 9, 9'. The accumulators 33, 33' may further be adapted for the parallel action of the deflection distributor of the disclosed invention.

The deflection distributor refitting kit 100 in FIG. 7 further comprises one or more replacement rolls 3, 4 for a roller crusher 1. One of the rolls 3 has a flange 34, 34' attached to each end thereof. The flanges 34, 34' extend in a radial direction of the roll, and has a height above an outer surface of the roll. As the parallel movement of the second crusher roll 4 is ensured with the deflection distributor refitting kit according to the disclosed invention, the first roll 3 may be equipped with such flanges without any risk of misalignment and thereby no risk of damaging flanges or the surface of the crusher rolls. By having flanges 34, 34' arranged onto one of the crusher rolls 3 provides a much higher crushing result and a higher overall crushing pressure, and provide an increases throughput of about 10-20% or sometimes even more, in the roller crusher.

In an alternative embodiment the flanges are arranged on the second crusher roll 4, instead on the first crusher roll 3.

The deflection distributor kit 100 of FIG. 7 further comprises replacement bearings 5, 5', 6, 6' for the crusher rolls 3, 4. Bearings 5, 5', 6, 6' used in a roller crusher 1 are worn out after a period of time, and needs to be replaced and to replace these at the same time as the crusher rolls 3, 4 are replaced is beneficial and effective for the refurbishment and service work. Further these replacement bearings may be optimized for a roller crusher with a deflection distributor system arranged thereon, as disclosed above in the summary part of the description.

FIG. 8 discloses an alternative embodiment of the deflector distribution kit 100 where a crossbar 60 is attached to and interconnects the pivot brackets 31, 31'. The crossbar 60 allows for the thrust rods 21, 21' to be mounted with an offset to the end supports 11, 11' and/or the moveable bearing housings 8, 8'. This makes it possible to apply the invention without having to provide channels 29, 29' in the end supports 11, 11'. In some situations, such channels 29, 29' are unfavorable due to the presence of e.g. hydraulic hoses or pipes or electrical installations on or within the end supports 11, 11'. By using a crossbar 60 it is possible to have the thrust rods 21, 21' to be arranged alongside the end supports 11, 11' which can be left intact. The crossbar 60 can be attached to the pivot brackets 31, 31' by means of pin 61, here indicated as vertical pins. In this embodiment, the crossbar has a circular cross-section. Of course, other cross-sections are conceivable as well. The thrust rods 21, 21' are pivotably attached to the crossbar 60 by means of e.g. spherical bearings or bushings or any other suitable means that may withstand the forces and maintain the pivotable connection. The deflection distributing shaft 20 is here indicated to fit within the frame of a roller crusher 1 but it is of course possible to arrange the deflection distributing shaft 20 behind, similar to how it is shown in FIG. 3, or on top of the frame 2 instead. As can be seen in FIG. 8, the deflection distributing shaft 20 is rotatably arranged between inner surfaces of end supports 11, 11'. This provides a very compact construction which leaves a small footprint on the site where it is used. As a matter of fact, this solution ensures that the footprint of the roller crusher provided with the deflector distribution kit according to the invention has an identical footprint as that of the roller crusher without the deflector distribution kit. This is an important aspect since space is always limited on sites using this type of equipment.

Figure 10:
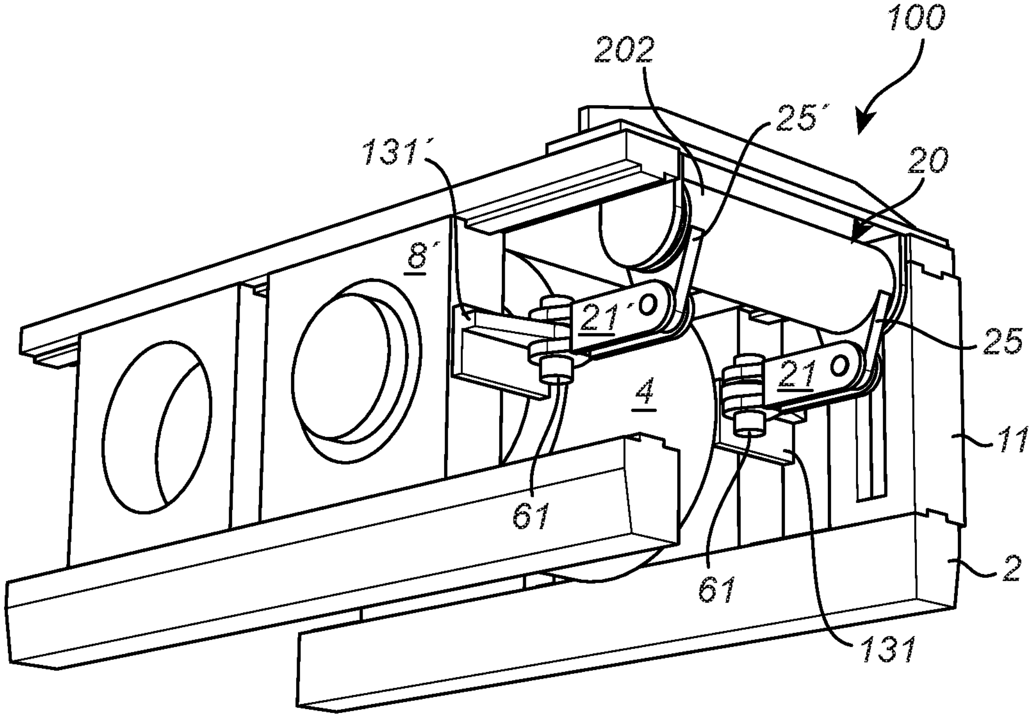
FIG. 10 shows a roller crusher with a deflection distributor refitting kit according to a further embodiment of the first aspect of the disclosed invention.

FIGS. 9 and 10 disclose alternative embodiments of the deflector distribution kit 100 where offset brackets 131, 131' are arranged at the moveable bearing housings 8, 8'. Similar to the crossbar 60 in FIG. 8, these offset brackets 131, 131' allows for the thrust rods 21, 21' to be mounted with an offset to the end supports 11, 11' and/or the moveable bearing housings 8, 8'. This makes it possible for the thrust rods 21, 21' to pass alongside of the end supports 11, 11'. Preferably, the thrust rods 21, 21' pass the end supports 11, 11' on the inner side. This reduces the footprint of the roller crusher in comparison with a solution where they pass on an outer side. As can be seen in FIG. 9, the deflection distributing shaft 20 is arranged on the rear side of the frame 2 whereas the deflection distributing shaft 20 in FIG. 10 is arranged within the frame 2. Both alternatives have their specific advantages. For example, the solution in FIG. 10 leaves a smaller footprint whereas the solution in FIG. 9 requires less free height.

Figure 11:
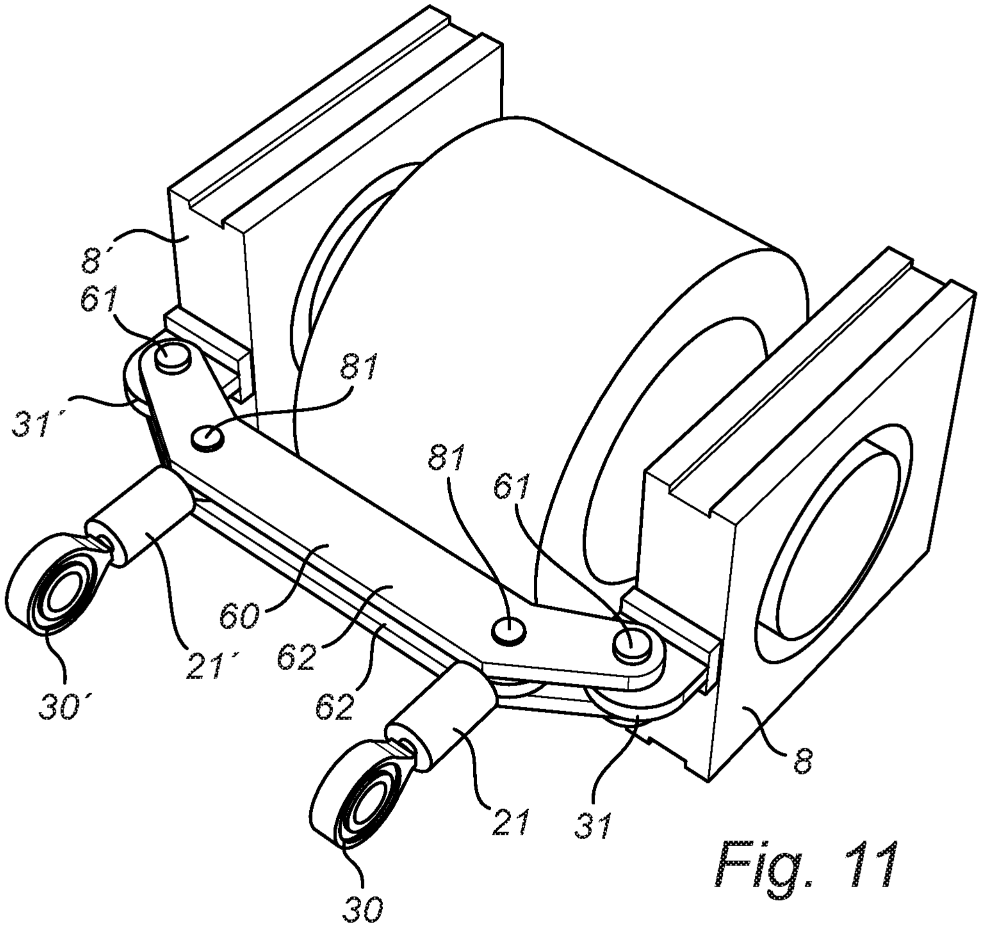
FIG. 11 shows a part of a deflection distributor refitting kit according to a further embodiment of the first aspect of the disclosed invention.

FIG. 11 discloses an alternative embodiment of the deflector distribution kit 100 where a crossbar 60 is provided. Similar to the embodiment in FIG. 8, the crossbar 60 in this embodiment extends between two adjacent, moveable bearing housings 8, 8'. The crossbar 60 in this embodiment comprises two adjacent, substantially flat crossbar elements 62 arranged on an upper and a lower side respectively of the pivot brackets 31, 31' and pivotably connected to the pivot brackets 31, 31' by means of vertical pin 61. The pin 61 can, however, be arranged in other directions than vertical, such as horizontal, as well or instead. Thrust rods 21, 21' are pivotably connected to the crossbar 60 by means of vertical pin 81 and the thrust rods 21, 21' are at their respective first ends pivotably connected to the levers by means of pivot bracket 30, 30', similar to previous embodiments. The solution of this embodiment has, similar to the embodiments of FIGS. 8 and 9, the advantage that the thrust rods 21, 21' can pass alongside the end supports 11, 11'. This embodiment also allows for the crossbar 60 to be assembled from smaller, separate parts, for example upper and lower substantially flat crossbar elements 62. This makes it easier to install and remove the crossbar. The flat crossbar elements 62 provide excellent structural rigidity for this purpose without excessive use of material.

Figure 12:
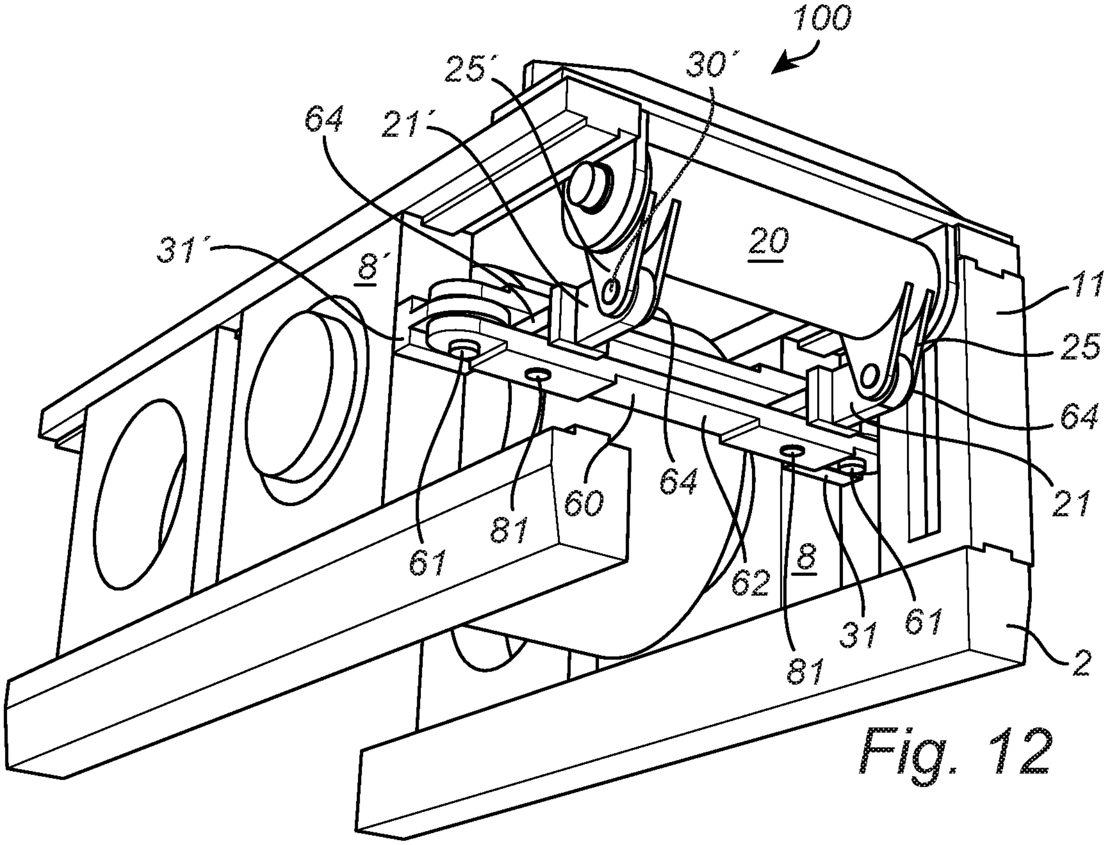
FIG. 12 shows a roller crusher with a deflection distributor refitting kit according to a further embodiment of the first aspect of the disclosed invention.

FIG. 12 discloses an embodiment similar to that shown in FIG. 11. Here, the thrust rods 21, 21' are more compact and preferably made from an integral part provided with bushings or bearings 64 through which pin 81 is inserted. This solution provides improved rigidity and due to the simple structure, it has long life span.

Figure 13:
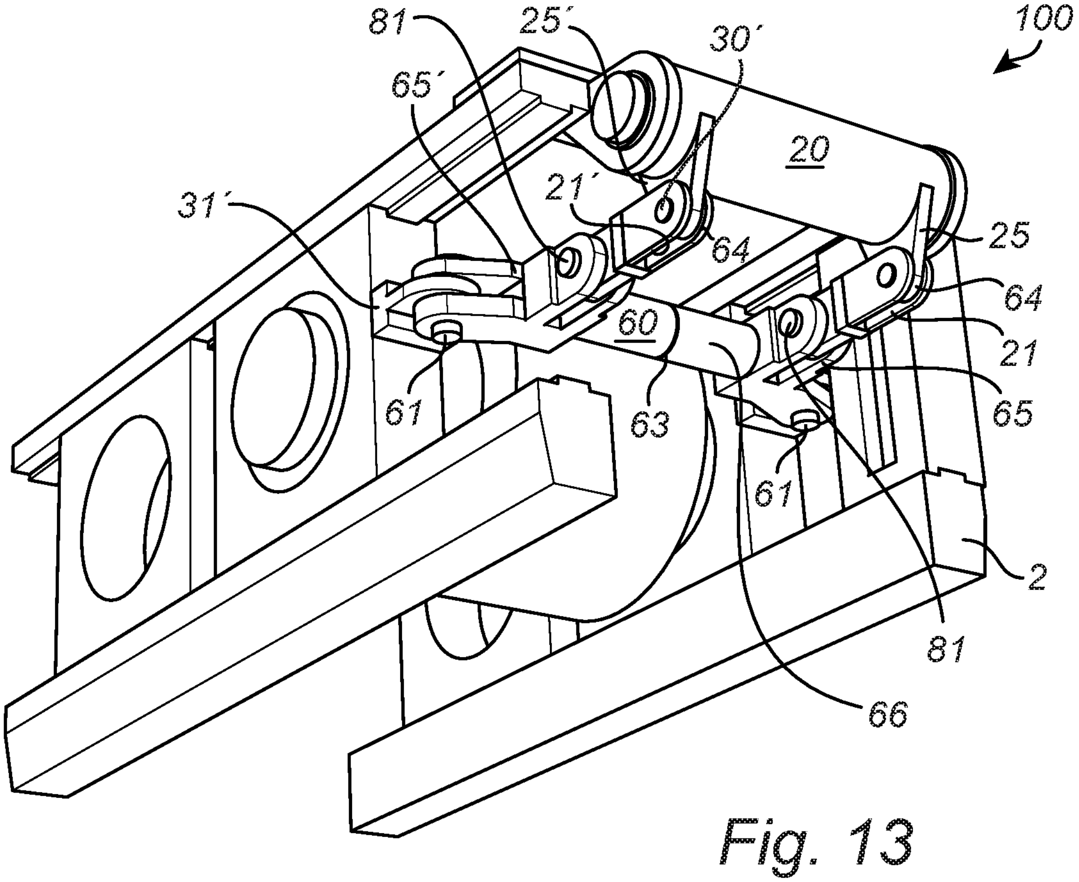
FIG. 13 shows a roller crusher with a deflection distributor refitting kit according to a further embodiment of the first aspect of the disclosed invention.

FIG. 13 discloses an embodiment having a crossbar 60. Crossbar 60 comprises at its ends brackets 65, 65' which are attachable to the moveable bearing housings 8, 8' via pivot brackets 31, 31' by means of vertical pin 61. Similar to the embodiment in FIG. 11, the thrust rods 21, 21' are compact and made from an integral part provided with bushings or bearings 64 for long life span. Between the brackets 65, 65', the crossbar 60 comprises a tubular section 66 fixedly connected to the brackets 65, 65'. The tubular section 66 may also be made up from two pieces, creating a split crossbar. This has advantages in that it simplifies assembly and disassembly. Instead of using a tubular section 66, other cross-sections are of course conceivable, for example rectangular, oval or any other suitable shape.

Figure 14:
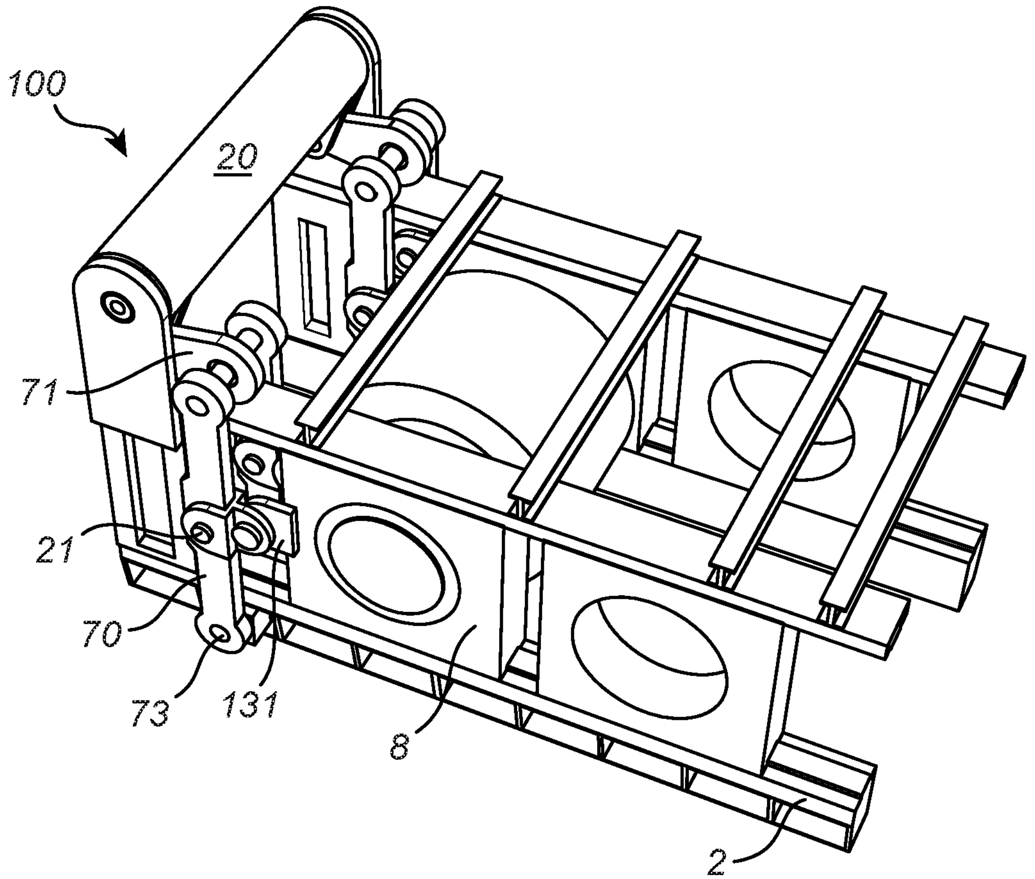
FIG. 14 shows a roller crusher with a deflection distributor refitting kit according to a further embodiment of the disclosed invention.
Figure 15:
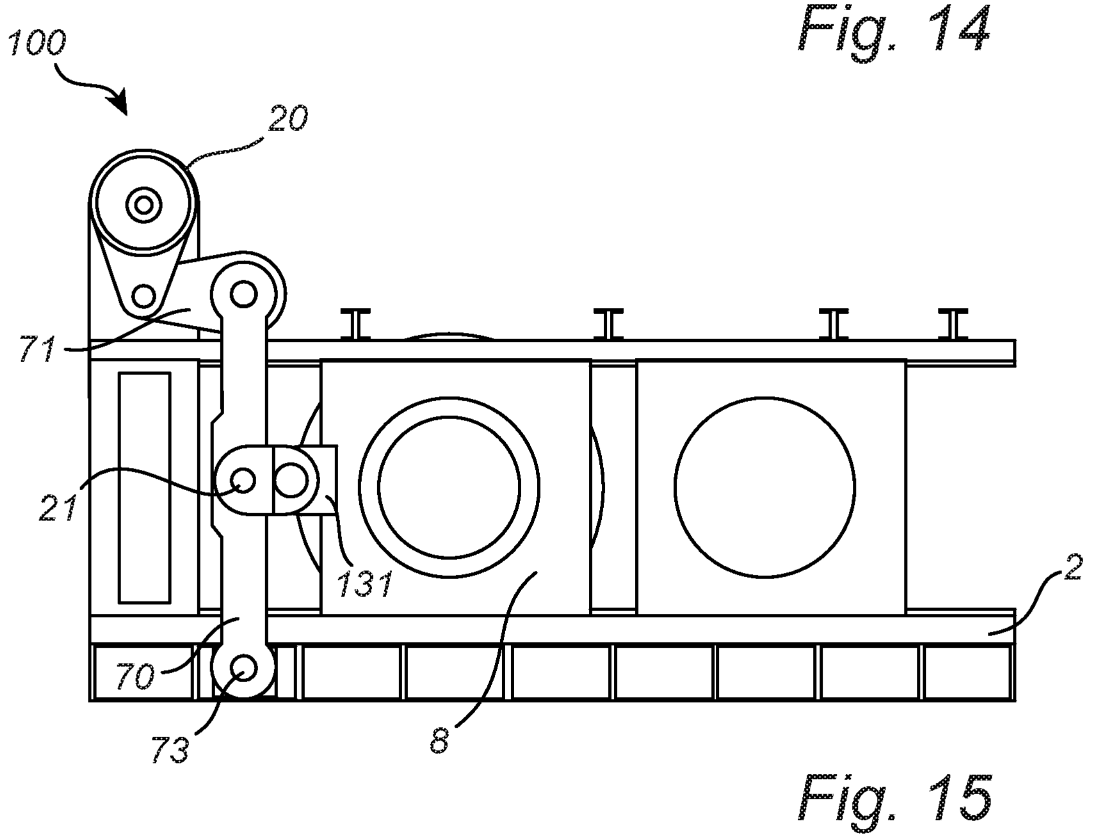
FIG. 15 shows a roller crusher with a deflection distributor refitting kit according to a further embodiment of the disclosed invention.

FIGS. 14 and 15 disclose an embodiment where a lever arm 70 is provided. A first portion of lever arm 70, here indicated as an end portion, is pivotally connected to a lower part of the frame 2 of the roller crusher. A second portion, here indicated as a second end portion of lever arm 70, is pivotally connected to the lever 25, 25' through links 71, 71' and the thrust rods are connected to the lever arm 70 at a position lying in between these first and second portions. The thrust rods 21, 21' are attached to the moveable bearing housings via offset brackets 131, 131' which allow the thrust rods 21, 21' to pass alongside both the inner and the outer side of the frame 2 of the roller crusher, hence not requiring any, or at least very few, modifications of the roller crusher as such. The arrangement of a pivotal point at a lower part of the frame 2 has advantages in that the forces occurring can be handled in excellent manner by the frame 2 since the forces can be divided by the upper and the lower parts of the frame 2 in a convenient manner. Further, as can be seen in FIGS. 14 and 15, the deflection distributing shaft 20 can be arranged on top of the frame 2 of the roller crusher without creating any additional foot print. Even in a situation where the second roll 4 is in a fully retracted position, i.e. where the gap between the rolls 3, 4 is at a maximum, no part of the deflection distributor refitting kit adds to the length of the roller crusher to which it is mounted. In the FIGS. 14 and 15, a total of four lever arms 70 are disclosed and a total of four thrust rods 21, 21' are disclosed. It is obvious to the skilled person that the number and specific arrangements of these elements can be chosen as deemed suitable. For example, one lever arm 70 for each side of the roller crusher would also be conceivable and even a single, centrally arranged lever arm 70 would be possible. The same applies for the thrust rods, 21, 21' and the links 71, 71', namely that the number of elements and position thereof can be varied. This embodiment also maintains a substantially horizontal position of the thrust rods 21, 21' throughout the entire stroke thereof which is advantageous since it reduces the forces introduced in the frame 2. Similar to other embodiments described herein, spherical bearings are suitable for the pivotal connections between the frame 2, lever arm 70, thrust rods 21, 21', moveable bearing houses, links 71, 71', levers 25, 25'.

Figure 16:
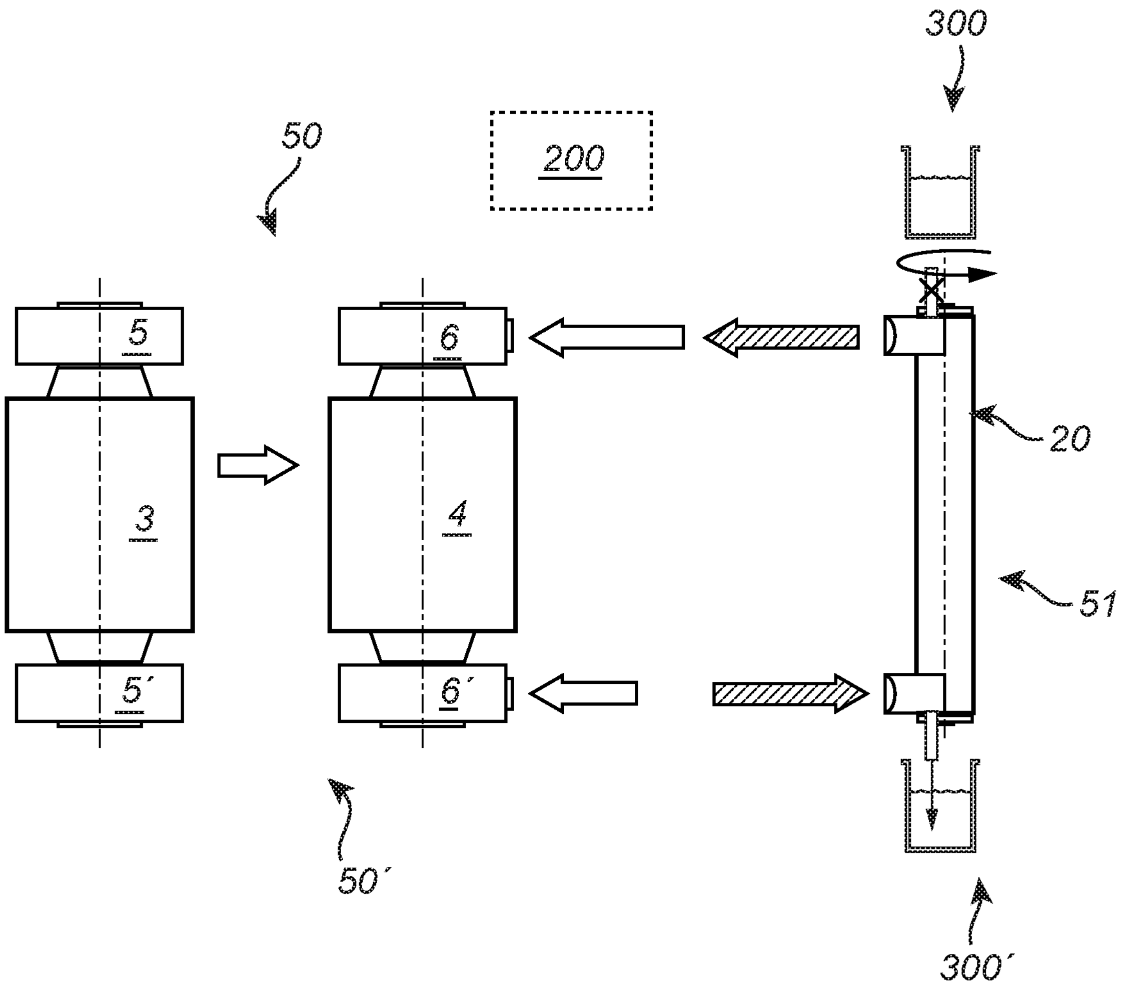
FIG. 16 shows a schematic view of a deflection distributor refitting kit and a control system according to a further embodiment of the disclosed invention.

FIG. 16 discloses an embodiment having a control system 200 in combination with the deflection distributor. The control system 200 is configured to monitor a skew between the first and second crusher rolls 3, 4 and wherein the control system 200 is further configured to reduce pressure in the hydraulic system 10, 10' on the first or second side in response to a determination that the skew exceeds a predefined threshold value. The provision of such control system reduces the forces acting on the deflection distributor such that the structural dimensions of the parts can be reduced and focus on achieving maximum rigidity can be reduced without sacrificing anti-skewing properties. Here, no complicated hydraulic control systems are required. Instead, in response to a determined exceeding of a predefined threshold skew value, it is sufficient to just reduce the pressure in the hydraulic system on the least deflected side. Such pressure reduction can be achieved by simply opening a valve with sufficient area such that hydraulic liquid can be drained from the system into a suitable container. When the skewing is reduced below the threshold value, the valve is closed and hydraulic liquid may be returned into the hydraulic system 10, 10'. In FIG. 16 it can be seen that a non-even load has occurred and that the crushing force acting on the moveable crusher roll 4 is greater towards a first side 50 of the roller crusher. The deflection distributor will compensate for this and minimize skew but if the occurring forces are too big, at some point the deflection distributor may reach its limits. In such a case, the control system 200 will notice that the skew exceeds a predefined threshold. In response to this, the control system will reduce pressure at the second side 50', being less deflected, thus helping the deflection distributor in its attempts of minimizing skew. The pressure reduction can be made in many ways, one being as simple as opening a valve in order to evacuate hydraulic fluid from the hydraulic system 10' letting it flow into a vessel 300'. As soon as the skewing is back below the predefined threshold, the valve may be closed and the hydraulic fluid may be returned into the hydraulic system 10'. It should be noted that the control system in accordance with this embodiment can be integrated in an already existing control system of the roller crusher. It can also be constituted by a completely separate system or even be performed manually.

Figure 18:
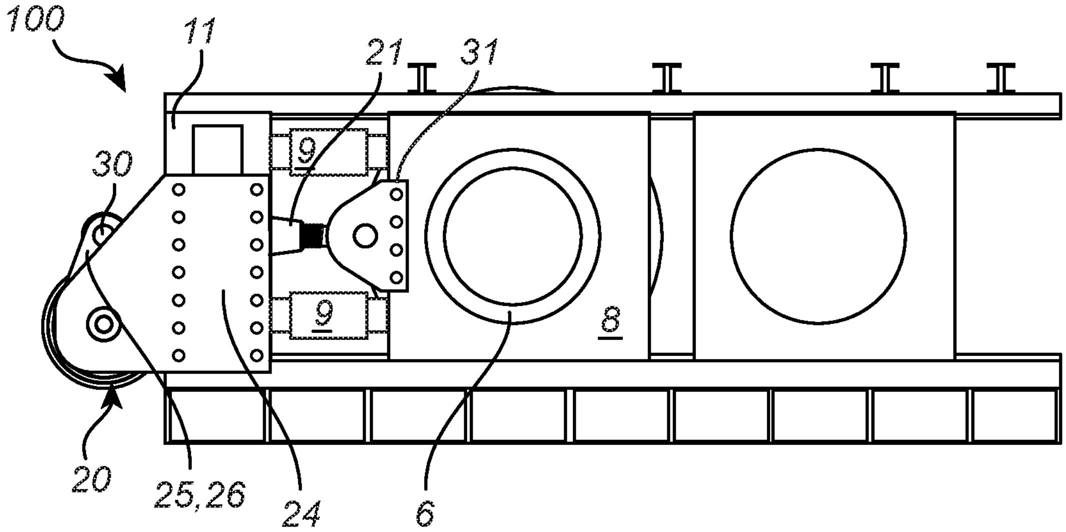
FIG. 18 shows a side view of a roller crusher with a deflection distributor refitting kit according to an embodiment of the first aspect of the disclosed invention.

As stated above, FIGS. 17 and 18 show a perspective view and a side view of a roller crusher of one embodiment of the present invention. The two hydraulic cylinders 9 are shown with the thrust rod 21 arranged in-between in FIG. 18, while the hydraulic cylinders have been left out in FIG. 17, in order to show the other details more clearly. In this embodiment the mounts 24 are bolted to the respective end supports 11, but as stated earlier other fastening options are conceivable to the person skilled in the art, e.g. welding. The thrust rods 21 are in this embodiment attached to the moveable bearing housings 8, by means of first pivot bracket 31 and to the levers 25, by means of second pivot brackets 30. Other attachment methods, as described in other parts of the application, are conceivable. In this embodiment the deflection distributing shaft 20 with levers 25 and mounts 24 are mounted to a lower end of the frame 2 of the roller crusher 1, while the deflection distributing shaft 20 with levers 25 and mounts 24 are mounted to an upper end of the frame 2 in the embodiment shown in FIG. 3. Arranging the deflection distributing shaft 20 with levers 25 and mounts 24 at or near a lower end of the frame 2 as shown in FIGS. 16 and 17 is sometimes advantageous. It makes maintenance of the bearings of the deflection distributing shaft 20 and levers 25 easier since they are accessible from the lower end of the frame, i.e. at or near ground level. Also, installation is less cumbersome since the parts do not have to be lifted far from the ground. Often, there is a top platform at or near an upper end of the frame 2 with which access is given to equipment from above. With the embodiment shown in FIGS. 16 and 17, such platform does not need to be modified to make room for e.g. the deflection distributing shaft 20 and mounts 24. In FIGS. 16 and 17, the thrust rods 21 are shown to pass through openings in end supports 11. However, other means are conceivable as disclosed elsewhere in this application, for example as disclosed in FIGS. 8-13 where the thrust rods pass alongside the end supports 11.

The skilled person realizes that a number of modifications of the embodiments described herein are possible without departing from the scope of the invention, which is defined in the appended claims.

When mounted in a roller crusher 1, the deflection distributor 100 according to the disclosed invention is idling (no force or pressure action) during balanced feed and uniform material feed distribution, and is only in operation during unstable feed situations, such as non-uniform material feed characteristics along the length of the crushing gap and/or non-crushable material entering off center within the crushing gap. Thus, the deflection distributor 100 is controlling each bearing housing deflection separately by manipulating the accumulator spring constant for the roller crusher keeping a constant feed pressure profile.

The deflection distributor 100 according to the disclosed invention provides the required instant parallel deflection response time to handle the non-uniform material feed characteristics along the length of the crushing gap.

Existing solutions within prior art for dealing with non-uniform feed characteristics and/or tramp comprise moving oil from one side to the other to compensate for skewing events developed by uneven feed by means of valves and pumps. However, these systems are not quick enough to limit the skewing to an acceptable level which allows for use of flanges on one of the crusher rolls and at the time preserving the shock absorbing spring effect without overloading or underloading the system. Further, when compensating for non-uniform feed characteristics, the hydraulic systems in these prior art solutions normally adjusts the second crusher roll 4 away from the center of the crushing gap, which decreases the crushing pressure and provides inadequate crushing within the roller crusher. This increases the amount of material which needs to be recirculated.

Keeping the crusher rolls in parallel and a more or less constant crusher pressure on the feed over the length of the crusher rolls as well as over time is key and important for a uniform production. Further, the inventive deflection distributor position and suspension in a roller crusher together with the design thereof minimizes the inertia and resulting forces from it during rapid movement of the second crusher roll 4.

Further, as is disclosed in the summary part the deflection distributor may also be arranged with a roller crusher having two crushing rolls being movable within the frame, and in such cases one deflection distributor may be arranged for each crusher roll. It is further possible to arrange the deflection distributor on a roller crusher having crushing rolls which have bearing housings which are pivotably movable relative to a frame. Further, it is possible to arrange mounts of the distributor refitting shaft on a separate stand in the proximity to an end side of a roller crusher frame holding a movable crusher roll instead of connecting it directly to the frame, and still attach the thrust rods to the movable bearing housings of the movable crusher roll.

The skilled person also realizes that the lever as described herein, should in general be interpreted as the function provided thereby. For example, it is possible to attach the first end of the thrust rod in an off-center manner to the deflection distributing shaft, thereby creating the required leverage. In general, the lever can be achieved in many ways by creating a distance between the attachment of the first end of the thrust rod and a rotational axis of the deflection distributing shaft.

The skilled person also realizes that even though bearing are mentioned regarding the joints between e.g. thrust rods and bearing housing and between thrust rod and deflection distributing shaft, other means are possible with the scope of the present invention. For example bushings or other kinds means available to obtain a joint.

The skilled person also realizes that the reduction of pressure in the hydraulic system as described in one embodiment herein, may refer to a partial pressure reduction only or to a total pressure release, as the requirements may be.

The skilled person realizes that the different embodiments described herein are compatible with each other and the advantages discussed herein with respect to the different embodiments are equally applicable when the embodiments are combined with each other. For example, the embodiments described with respect to the preload arrangement described in FIGS. 2A-2H are all possible to combine with the individual embodiments described in FIGS. 3-18.

We claim:

1. A deflection distributor refitting kit for a roller crusher including a frame and movable bearing housings, comprising:

a deflection distributing shaft, thrust rods each having first and second ends and mounts for attachment of said deflection distributing shaft at a first and a second side of the frame of said roller crusher, wherein the first end of each of said thrust rods is attached to said deflection distributing shaft via a lever, wherein the second end of each of said thrust rods is capable of being attached to one of the movable bearing housing of said roller crusher, wherein the deflection distributing shaft, the mounts, the levers and the thrust rods form individual sub parts of, and together define, a mechanical connection between the movable bearing housings, wherein the deflection distributor refitting kit further comprises a preload arrangement which is configured to induce a bias to the deflection distributor refitting kit such that the individual sub parts are at all times mutually biased in relation to each other to reduce shock loads to the mechanical connection during operation of the roller crusher, and wherein the deflection distributing shaft is hollow and has a wall thickness of 10 to 200 mm.

2. The deflection distributor refitting kit according to claim 1, wherein said bias comprises a compression load to a first thrust rod of the thrust rods in a direction parallel to a longitudinal direction of the first thrust rod and a tension load to a second thrust rod of the thrust rods in a direction parallel to a longitudinal direction of the second thrust rod.

3. The deflection distributor refitting kit according to claim 1, wherein said bias comprises compression load to the thrust rods in a direction parallel to a longitudinal direction of each of the thrust rods.

4. The deflection distributor refitting kit according to claim 1, wherein said bias comprises a tension load to both thrust rods in a direction parallel to a longitudinal direction of each of the thrust rods.

5. The deflection distributor refitting kit according to claim 1, wherein said bias comprises a load applied to at least one of the thrust rods in a direction perpendicular to a longitudinal direction of the thrust rod.

6. The deflection distributor refitting kit according to claim 1, wherein said preload arrangement comprises a spring element.

7. The deflection distributor refitting kit according to claim 6, wherein said spring element is capable of being mounted between the moveable bearing housing and at least one of the thrust rods.

8. The deflection distributor refitting kit according to claim 1, wherein said preload arrangement comprises a length adjustment means of at least one of the thrust rods.

9. The deflection distributor refitting kit according to claim 8, wherein said length adjustment means of at least one of the thrust rods comprises a threaded connection.

10. The deflection distributor refitting kit according to claim 1, wherein said deflection distributing shaft is rigid.

11. The deflection distributor refitting kit according to claim 1, wherein end supports are provided which are capable of being mounted at the frame of the roller crusher at said first and second sides thereof.

12. The deflection distributor refitting kit according to claim 11, wherein said thrust rods are capable of being arranged to pass by/through said end supports.

13. The deflection distributor refitting kit according to claim 1, wherein a spring element is provided on at least one of the end supports and is capable of exerting a bias on a corresponding thrust rod in a direction perpendicular to a longitudinal direction of said thrust rod.

14. A method for mounting a deflection distributor refitting kit according to claim 1 to a roller crusher, said roller crusher includes a frame, a first crusher roll and a second crusher roll arranged axially in parallel with each other, said first crusher roll being supported in a pair of first bearing housings arranged in the frame, said second crusher roll being supported in a pair of second bearing housings which are configured to be movable, and a hydraulic system configured to adjust the position of the second crusher roll and a crushing pressure between the two crusher rolls, wherein the method comprises:

attaching each of the second ends of the thrust rods to one of the pair of movable second bearing housings;

attaching the deflection distributing shaft at said frame by means of the mounts; and activating a preload arrangement to induce a bias to the deflection distributor refitting kit such that the individual sub parts are at all times mutually biases in relation to each other.

15. The method for mounting a deflection distributor refitting kit according to claim 14, wherein said deflection distributor refitting kit is mounted in parallel to the hydraulic system of the roller crusher.

16. A roller crusher comprising:

a frame;

first and second crusher rolls arranged axially in parallel with each other, said first crusher roll being supported in first bearing housings which are arranged in the frame, said second crusher roll being supported in second bearing housings which are configured to be movable;

a hydraulic system configured to adjust the position of the second crusher roll and a crushing pressure between the first and second crusher rolls; and a deflection distributor, wherein said deflection distributor comprises:

a deflection distributing shaft, mounts for attaching said deflection distributing shaft at said frame of said roller crusher, and thrust rods each having first and second ends, wherein the first end of each of said thrust rods is attached to said deflection distributing shaft via a lever, wherein the second end of each of said thrust rods is attached to one of the second movable bearing housings of said second crusher roll, wherein the deflection distributing shaft, the mounts, the levers and the thrust rods form individual sub parts of, and together define, a mechanical connection between the movable bearing housings, and a preload arrangement is arranged to induce a bias into the thrust rods or into the deflection distributing shaft such that the individual sub parts are at all times mutually biased in relation to each other to reduce shock loads to the mechanical connection during operation of the roller crusher, wherein the deflection distributing shaft is hollow and has a wall thickness of 10 to 200 mm.

17. The roller crusher according to claim 16, wherein said bias comprises a compression load to a first thrust rod of the thrust rods in a direction parallel to a longitudinal direction of the first thrust rod and a tension load to a second thrust rod of the thrust rods in a direction parallel to a longitudinal direction of the second thrust rod.

18. The roller crusher according to claim 16, wherein said bias comprises compression load to the thrust rods in a direction parallel to a longitudinal direction of each of the thrust rods.

19. The roller crusher according to claim 16, wherein said bias comprises a tension load to both thrust rods in a direction parallel to a longitudinal direction of each of the thrust rods.

20. The roller crusher according to claim 16, wherein said bias comprises a load applied to at least one the thrust rods in a direction perpendicular to a longitudinal direction of the thrust rod.

21. The roller crusher according to claim 16, wherein said preload arrangement comprises a spring element.

22. The roller crusher according to claim 21, wherein said spring element is arranged to be mounted between one of the second moveable bearing housings and at least one of the thrust rods.

23. The roller crusher according to claim 16, wherein the deflection distributor is connected to the second roll in a manner parallel with the hydraulic system.

24. The roller crusher according to claim 16, wherein one roll of the first and second crusher rolls has a flange attached to each end thereof, and which flange extends in a radial direction of the roll and has a height above an outer surface of the roll.

25. The roller crusher according to claim 16, wherein the frame includes end supports.

26. The roller crusher according to claim 25, wherein said thrust rods are arranged to pass by/through said end supports.

27. The roller crusher according to claim 26, wherein a spring element is provided on at least one of the end supports and is arranged to exert a bias on a corresponding thrust rod in a direction perpendicular to a longitudinal direction of said thrust rod.

28. The roller crusher according to claim 16, wherein said preload arrangement comprises a length adjustment means of at least one of the thrust rods.

29. The roller crusher according to claim 28, wherein said length adjustment means of at least one of the thrust rods comprises a threaded connection.

* * * * *